US009920201B2

(12) United States Patent
Samec et al.

(10) Patent No.: US 9,920,201 B2
(45) Date of Patent: Mar. 20, 2018

(54) COMPOSITIONS OF BIOMASS MATERIALS FOR REFINING

(71) Applicant: REN FUEL K2B AB, Stockholm (SE)

(72) Inventors: Joseph Samec, Spanga (SE); Christian Dahlstrand, Uppsala (SE); Joakim Löfstedt, Uppsala (SE)

(73) Assignee: REN FUEL K2B AB, Stockholm (SE)

( * ) Notice: Subject to any disclaimer, the term of this patent is extended or adjusted under 35 U.S.C. 154(b) by 0 days.

(21) Appl. No.: 14/763,255

(22) PCT Filed: Jan. 24, 2014

(86) PCT No.: PCT/SE2014/050090
§ 371 (c)(1),
(2) Date: Jul. 24, 2015

(87) PCT Pub. No.: WO2014/116173
PCT Pub. Date: Jul. 31, 2014

(65) Prior Publication Data
US 2015/0361266 A1 Dec. 17, 2015

Related U.S. Application Data

(60) Provisional application No. 61/770,494, filed on Feb. 28, 2013.

(30) Foreign Application Priority Data

Jan. 25, 2013 (SE) ...................................... 1300069
Feb. 28, 2013 (SE) ...................................... 1350240
Mar. 19, 2013 (SE) ...................................... 1350341
Jun. 26, 2013 (SE) ...................................... 1350777

(51) Int. Cl.
*C08L 97/00* (2006.01)
*C07G 1/00* (2011.01)
*C09D 197/00* (2006.01)
*C10L 1/02* (2006.01)
*C10L 1/04* (2006.01)

(52) U.S. Cl.
CPC .............. *C08L 97/005* (2013.01); *C07G 1/00* (2013.01); *C09D 197/005* (2013.01); *C10L 1/02* (2013.01); *C10L 1/04* (2013.01); *C10L 2200/0469* (2013.01); *C10L 2200/0476* (2013.01); *C10L 2270/023* (2013.01); *C10L 2270/026* (2013.01); *Y02E 50/13* (2013.01)

(58) Field of Classification Search
CPC .. C08L 97/005; C10L 1/02; C10L 1/04; C10L 2200/0469; C10L 2200/0476; C10L 2270/023; C10L 2270/026; C09D 197/005
USPC .......................................................... 524/37
See application file for complete search history.

(56) References Cited

U.S. PATENT DOCUMENTS

| 2,410,578 | A | 11/1946 | Giammaria |
| 3,105,095 | A * | 9/1963 | Oshima ..................... C07C 1/00 |
| | | | 502/222 |
| 4,762,529 | A | 8/1988 | Schulz |
| 5,478,366 | A | 12/1995 | Teo et al. |
| 5,925,182 | A | 7/1999 | Patel et al. |
| 6,072,015 | A | 6/2000 | Bolle et al. |
| 8,211,189 | B2 | 7/2012 | Guay et al. |
| 8,465,558 | B2 | 6/2013 | Eriksson et al. |
| 8,465,559 | B2 | 6/2013 | Guay et al. |
| 2003/0100807 | A1 | 5/2003 | Shabtai et al. |
| 2004/0072939 | A1* | 4/2004 | Cornman ............ C04B 40/0039 |
| | | | 524/502 |
| 2009/0145021 | A1 | 6/2009 | Guay et al. |
| 2009/0218062 | A1 | 9/2009 | Schinski et al. |
| 2010/0325942 | A1 | 12/2010 | Eriksson et al. |
| 2012/0302699 | A1 | 11/2012 | Kobune et al. |
| 2012/0329146 | A1 | 12/2012 | Guay et al. |

FOREIGN PATENT DOCUMENTS

| CN | 1218777 A | 6/1999 | |
| CN | 10179534 A | 8/2010 | |
| EP | 2025735 A1 | 2/2009 | |
| JP | 58-208388 | 12/1983 | |
| JP | 2011514403 | 5/2011 | |
| RU | 2150489 C1 | 6/2000 | |
| WO | WO-96/10067 A1 | 4/1996 | |
| WO | WO-98/31763 A1 | 7/1998 | |
| WO | WO-2009/102272 A1 | 8/2009 | |
| WO | WO-2009/116070 A2 | 9/2009 | |
| WO | WO-2010/037178 A1 | 4/2010 | |
| WO | WO-2011/003029 A2 | 1/2011 | |
| WO | WO 2011003029 A2 * | 1/2011 | .......... B01J 31/2243 |
| WO | WO-2012/005784 A1 | 1/2012 | |

OTHER PUBLICATIONS

Zakzeski et al., "The Catalytic Valorization of Lignin for the Production of Renewable Chemicals", Chem. Rev. 2010, 110, 3552-3599.*
International Search Report PCT/ISA/210 for International Application No. PCT/SE2014/050090 dated Jul. 1, 2014.
Zakzeski, Joseph, et al. "The Catalytic Valorization of Lignin for the Production of Renewable Chemicals." *Chemical Reviews* 110 (2010): 3552-3599.
Egeberg, Rasmus, et al. "Industrial-scale production of renewable diesel." *PTQ* Q3 (2011): 59-65.
Huber, George W. and Avelino Corma. "Synergies between Bio- and Oil Refineries for the Production of Fuels from Biomass." *Angewandte Chemie* 46 (2007): 7184-7201.

(Continued)

*Primary Examiner* — Ling Choi
*Assistant Examiner* — Ronald Grinsted
(74) *Attorney, Agent, or Firm* — Harness, Dickey & Pierce, P.L.C.

(57) ABSTRACT

The present invention relates to a composition and a method for preparing said composition where the composition comprises a lignin, a solvent, a carrier liquid, and a fatty acid, wherein the lignin constitutes at least 4 weight % of the composition and has a weight average molecular weight of not more than 5,000 g/mol, wherein the solvent is an alcohol, ether, organic ester, sulfoxide, ketone, aldehyde or a combination thereof, and wherein the carrier liquid is a hydrocarbon oil.

17 Claims, 3 Drawing Sheets

(56) References Cited

OTHER PUBLICATIONS

Schuerch, Conrad. "The Solvent Properties of Liquids and Their Relation to the Solubility, Swelling, Isolation and Fractionation of Lignin." *Journal of the American Chemical Society* 74.20 (1952): 5061-5067.

Brodin "Chemical Properties and Thermal Behavior of Kraft Lignins," Licentiate Thesis at KHT Royal Institute of Technology, pp. iii-47 (2009).

Except from Swedish Office Action dated Dec. 27, 2016 issued in corresponding Swedish Patent Application No. 1450071-4.

\* cited by examiner

COMPOSITIONS OF BIOMASS MATERIALS FOR REFINING

FIELD OF THE INVENTION

The present invention relates to compositions of biomass material or derivative of biomass material in a solvent for, but not restricted to, applications in a refinery, such as oil or bio oil refinery.

BACKGROUND

Lignin is a complex biopolymer found in the cell walls of plants and is most commonly derived from wood and some algae. Lignin, cellulose, hemicellulose and pectin are the major components in the cell wall and lignin, together with the hemicellulose, provide mechanical strength to the cell wall.

Today lignin may be used as a component in for example pellet fuel as a binder but it may also be used as an energy source due to its high energy content. Lignin has higher energy content than cellulose or hemicelluloses and one gram of lignin has on average 2.27 KJ, which is 30% more than the energy content of cellulosic carbohydrate. The energy content of lignin is similar to that of coal. Today, due to its fuel value lignin removed using the kraft process, sulphate process, in a pulp or paper mill, is usually burned in order to provide energy to run the production process and to recover the chemicals from the cooking liquor.

There are several ways of separating lignin from black or red liquor obtained after separating the cellulose fibres in the kraft or sulphite process respectively, during the production processes. One of the most common strategies is ultra-filtration. Lignoboost® is a separation process developed by Innventia AB and the process has been shown to increase the lignin yield using less sulphuric acid. In the Lignoboost® process, black liquor from the production processes is taken and the lignin is precipitated through the addition and reaction with acid, usually carbon dioxide ($CO_2$), and the lignin is then filtered off. The lignin filter cake is then re-dispersed and acidified, usually using sulphuric acid, and the obtained slurry is then filtered and washed using displacement washing. The lignin is usually then dried and pulverized in order to make it suitable for lime kiln burners or before pelletizing it into pellet fuel. Biofuel, such as biogasoline and biodiesel, is a fuel in which the energy is mainly derived from biomass material or gases such as wood, corn, sugarcane, animal fat, vegetable oils and so on. However the biofuel industries are struggling with issues like food vs fuel debate, efficiency and the general supply of raw material. At the same time the pulp or paper making industries produces huge amounts of lignin which is often, as described above, only burned in the mill.

Two common strategies for exploring biomass as a fuel or fuel component are to use pyrolysis oils or hydrogenated lignin. However these strategies demand high pressure and the use of hydrogen gas which is both expensive and may be dangerous. There is therefore a need for a less complex method to prepare biomass in order for it to be processed at a biorefinery, but also in order to process the lignin into fine chemicals or paint or paint additives for example.

SUMMARY OF THE INVENTION

The present application discloses a composition comprising biomass material and solvent where the composition may be used in refinery processes for fuel production.

In a first aspect the present invention relates to a composition comprising lignin or lignin derivatives, a solvent and a carrier liquid;
wherein the lignin or lignin derivatives constitutes at least 4 weight % of the composition and wherein the lignin or lignin derivatives have a weight average molecular weight of not more than 5,000 g/mol, and wherein the solvent comprises at least one alcohol, ether or organic ester, sulfoxide, ketone, aldehyde or a combination thereof.

In a second aspect the present invention relates to a method of producing the composition according to the present invention comprising:
  providing lignin or lignin derivatives having a weight average molecular weight of not more than 5,000 g/mol;
  providing a solvent comprising at least one alcohol, ether, sulfoxide, ketone, aldehyde or ester or a combination thereof, and a carrier liquid; and
  adding the lignin or lignin derivatives to the solvent and the carrier liquid to obtain a concentration of at least 4 weight % and mixing.

A third aspect relates to the use of the composition of the present invention for preparing fuel.

A fourth aspect is a fuel obtained from the composition according to the present invention.

A fifth aspect of the present invention relates to the use of the composition according as concreted grinding aid, set retarder for cement, strengthener of cement, antioxidant, enhancer of thermal protection, stabilizer in asphalt, emulsifying agent, fiber strengthening additive, cross-linking agent, board binder, anti-corrosion additive, wear resistant additive, antifriction additive, binder, emulsifier or dispersing agent, cross-linking or curing agent, or as a water absorption inhibitor or as a fluidization agent, as an anti-bacterial or anti-fungal surface or as a barrier, to impregnate wood or as an anti-corrosion agent.

A sixth aspect of the present invention relates to a composition comprising lignin or lignin derivatives, a solvent and fatty acid;
wherein the lignin or lignin derivatives constitutes at least 4 weight % of the composition and wherein the lignin or lignin derivatives have an average molecular weight of not more than 5,000 g/mol, and wherein the solvent comprises at least one alcohol, ether, sulfoxide, ketone, aldehyde or ester or a combination thereof.

A seventh aspect of the present invention relates to a composition comprising lignin or lignin derivatives and a solvent;
wherein the lignin or lignin derivatives constitutes at least 4 weight % of the composition and wherein the lignin or lignin derivatives have an average molecular weight of not more than 5,000 g/mol, and wherein the solvent comprises at least one alcohol, ether, sulfoxide, ketone, aldehyde or ester or a combination thereof.

DETAILED DESCRIPTION OF THE INVENTION

Figure 1:
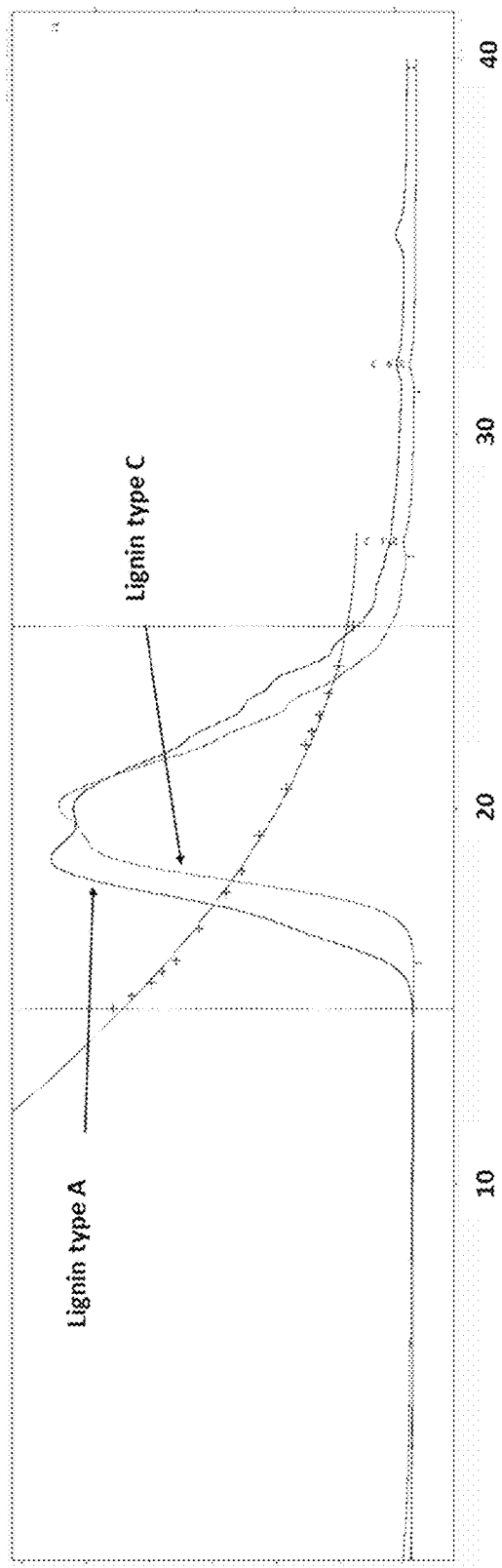
FIG. 1, GPC curve from Lignin type A and Lignin type C. Lignin type C has a weight average molecular weight (Me) of 1426 g/mol and a polydispersity (PD) of 1.87.
Figure 2:
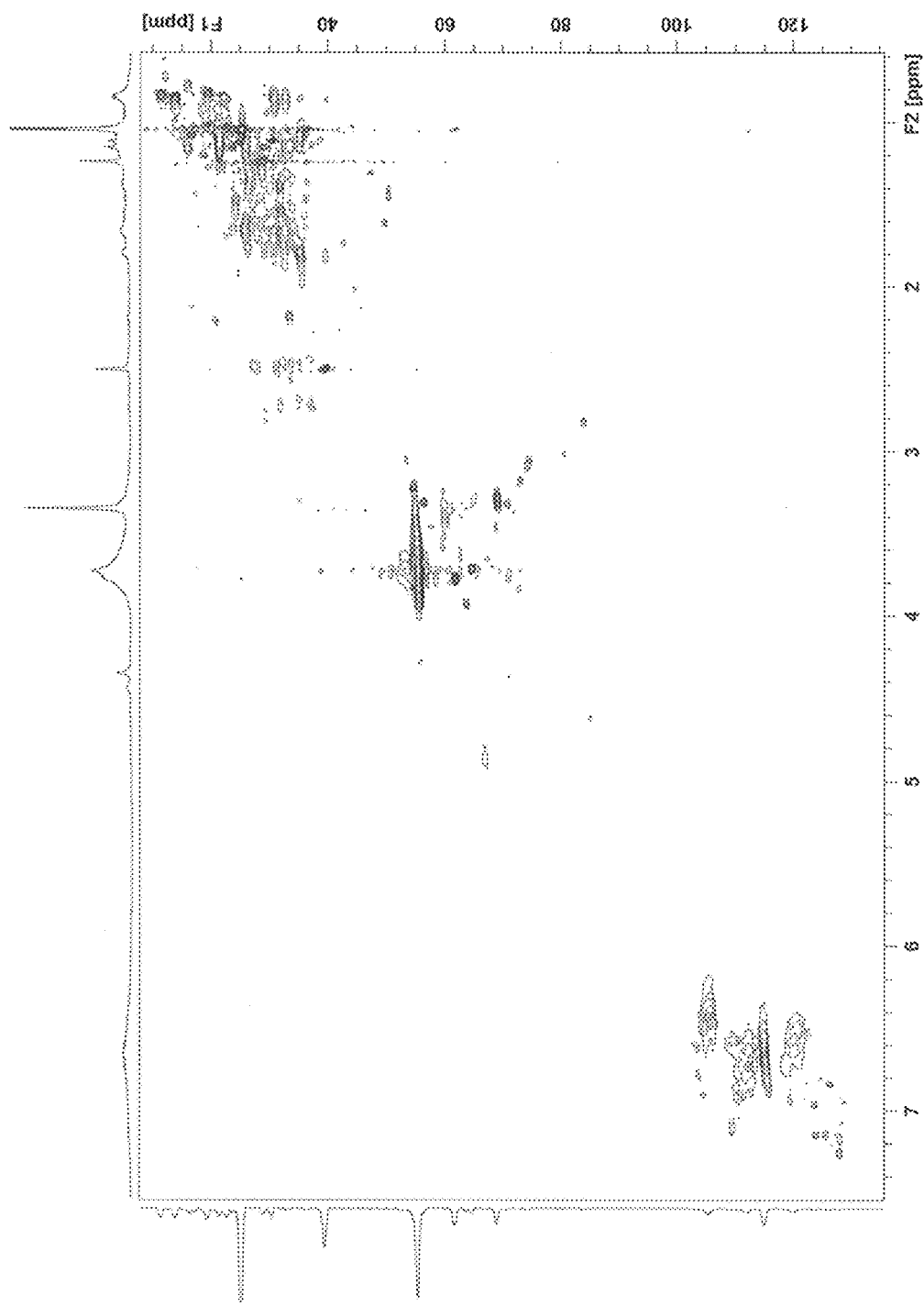
FIG. 2, HSQC from Lignin type C.
Figure 3:
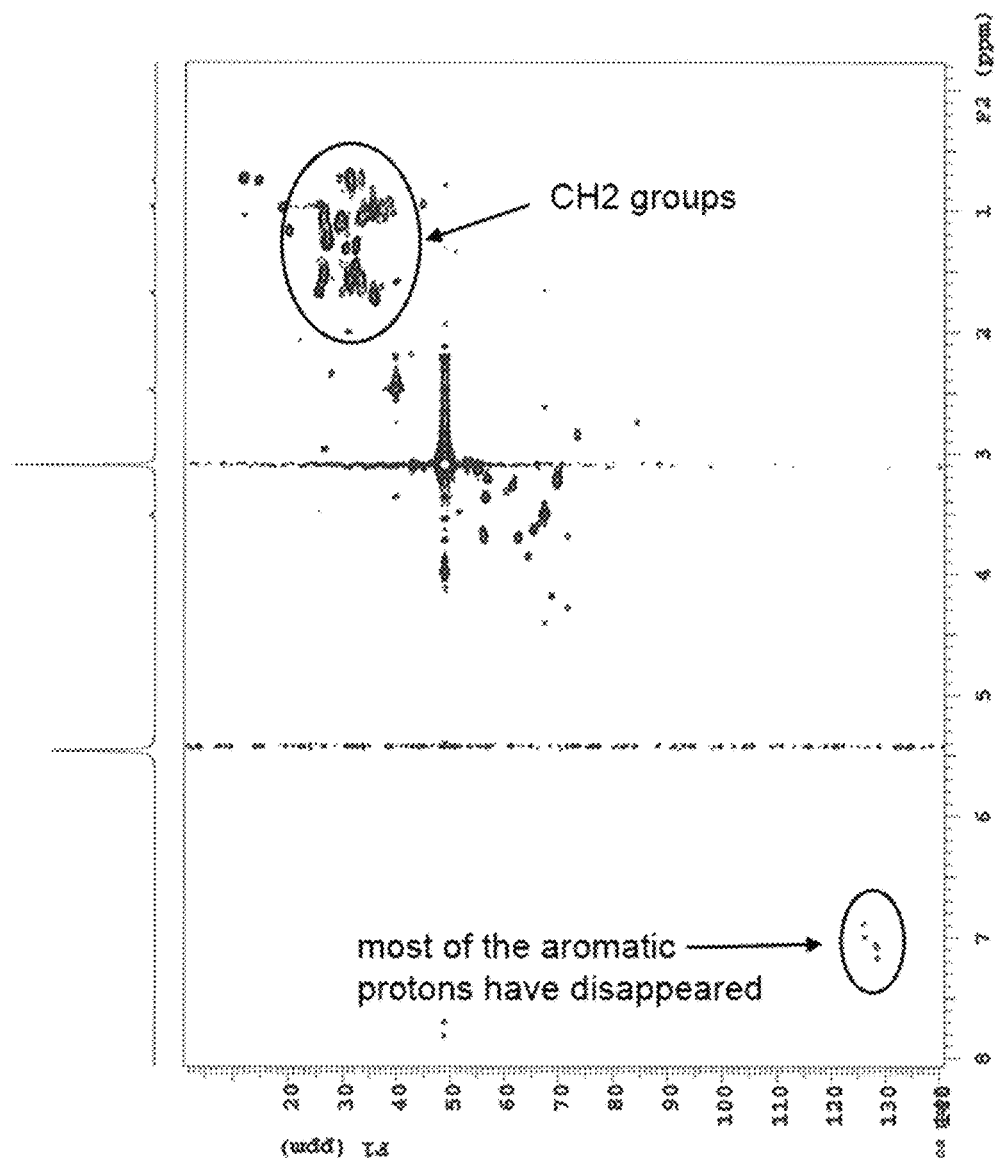
FIG. 3, HSQC of Lignin type F.

The present invention presents a composition for use in refinery processes for the production of various fuels.

For a substance to be processed in a refinery such as an oil refinery or bio oil refinery, the substance needs to be in liquid phase. Either the substance is in liquid phase at a given temperature (usually below 80° C.) or the substance is dissolved in a liquid. The present invention presents a composition and a method of preparing said composition where the composition comprises lignin or lignin derivatives, where the lignin or lignin derivatives is in liquid phase or dissolved in a liquid and may be processed in a refinery. The present invention makes it easier or even facilitates production of fuel from biomass material.

The composition of the present invention is a liquid composition of a biomass material and a solvent, preferably also a carrier liquid. In one embodiment the biomass material comprises lignin or lignin derivatives and the solvent comprises an alcohol, ether, sulfoxide, ketone, aldehyde or ester or a combination thereof.

In the present application the term "lignin derivative" means molecules or polymers derived from lignin. In the present application "lignin derivative" and "molecules or polymers derived from lignin" are used interchangeably. These molecules or polymers may be a result of chemical modification or degradation of lignin or a lignin source, for example when treating black or red liquor in order to precipitate or separate lignin.

In the present application the terms "red liquor" and "brown liquor" denote the same liquor.

Biomass and Biomass Material

Biomass includes, but is not limited to, plant parts, fruits, vegetables, processing waste, wood chips, chaff, grain, grasses, corn, weeds, aquatic plants, hay, paper, paper products, recycled paper and paper products, lignocellulosic material, lignin and any cellulose containing biological material or material of biological origin. Biomass materials and derivatives thereof often have a general formula of $C_xH_yO_z$ where the ratio z/x depends of origin, part of the plant and also processes of the biomass material, and where x and y each are $\geq 1$ and $z \geq 0$. Preferably x is $\geq 22$, or more preferably x is $\geq 3$, or more preferably x is $\geq 6$; z is preferably $\geq 1$, or $\geq 2$. In one embodiment x is $\geq 20$, in another embodiment x is $\leq 15$, and in yet another embodiment x is $\leq 11$. In one embodiment z is $\leq 10$ and in another embodiment z is $\leq 5$. The biomass material may comprise other heteroatoms such as S or N.

The following is a non-limiting list of biomass materials: cellulose $(C_6H_{10}O_5)_n$, glucose $(C_6H_{12}O_6)$, glycerol $(C_3H_8O_3)$, ethanol $(C_2H_6O)$; fatty acids such as, palmitoleic oil $(C_{16}H_{32}O_2)$, oleic acid $(C_{18}H_{34}O_2)$, tall oil or fatty acid $C_{17}H_{31-35}COOH$; rosin acids such as abeitic acid $(C_{20}H_{30}O_2)$; lignin or lignin derivatives in the range between of C1 to C20, such as $(C_{10}H_{10}O_2)$, $(C_{10}H_{12}O_3)$, $(C_{11}H_{14}O_4)$, lignin in black liquor such as $(C_{10}H_8O)$, $(C_{10}H_{10}O_2)$, $(C_{11}H_{12}O_3)$ and pyrolysis oil, etc. The fatty acids such as palmitoleic oil $(C_{16}H_{32}O_2)$, oleic acid $(C_{18}H_{34}O_2)$, tall oil or fatty acid $C_{17}H_{31-35}COOH$; rosin acids such as abeitic acid $(C_{20}H_{30}O_2)$; may also be used as a component in the composition according to the present invention. In one embodiment the lignin derivatives is in the range between of C1 to C20, such as $(C_9H_{10}O_2)$, $(C_{10}H_{12}O_3)$ and $(C_{11}H_{14}O_4)$ or lignin in or from black liquor such as $(C_9H_8O)$, $(C_{10}H_{10}O_2)$ and $(C_{11}H_{12}O_3)$. Examples of lignin units are guaiacol, coniferyl alcohol, sinapyl alcohol, ethyl 4-hydroxy-3-methoxy ketone, (4-hydroxy-3-methoxyphenyl)-propen, vanillin and phenol.

A biomass material may be in the form of a mixture of biomass materials and in one embodiment the biomass material is black or red liquor, or materials obtained from black or red liquor. Black and red liquor contains cellulose, hemi cellulose and lignin and derivatives thereof. The composition according to the present invention may comprise black or red liquor, or lignin or lignin derivatives obtained from black or red liquor.

In another embodiment the composition comprises residual material from ethanol production such as cellulosic or corn ethanol production, hereafter called ethanol production. In another embodiment the lignin or lignin derivatives is obtained from ethanol production.

Black liquor comprises four main groups of organic substances, around 30-45 weight % ligneous material, 25-35 weight % saccharine acids, about 10 weight % formic and acetic acid, 3-5 weight % extractives, about 1 weight % methanol, and many inorganic elements and sulphur. The exact composition of the liquor varies and depends on the cooking conditions in the production process and the feedstock. Red liquor comprises the ions from the sulfite process (calcium, sodium, magnesium or ammonium), sulfonated lignin, hemicellulose and low molecular resins.

In one embodiment the composition comprises black liquor in an amount of 80 weight % or more, or 90 weight % or more, or more preferably near 100 weight %. In one embodiment the composition comprises red liquor, preferably in an amount of 80 weight % or more, or 90 weight % or more, or more preferably near 100 weight %. The composition may comprise filtrate from black or red liquor, preferably from black liquor.

The weight average molecular weight (mass) $(M_w)$ of the lignin should not be more than 30,000 g/mol, preferably not more than 20,000 g/mol, or more preferably not more than 10,000 g/mol, or even more preferably not more than 5,000 g/mol, or even more preferably not more than 2,000 g/mol, or not more than 1,500 g/mol, or more preferably not more than 1,000 g/mol, or not more than 300 g/mol. The lignin or the lignin derivative may have a melting point at a temperature of at least 180° C., such as 190° C. or higher, or 200° C. or higher, or 300° C. or less, or 280° C. or less, or 270° C. or less, or the lignin or lignin derivatives may stay in liquid phase when dissolved in a solvent according to the present invention, at a temperature up to 150° C., such as 120° C. or less, or 100° C. or less, or 90° C. or less, or 80° C. or less, or 70° C. or less.

The amount of lignin or lignin derivatives in the composition may be 4 weight % or more, or 5 weight % or more, or 7 weight % or more, or 10 weight % or more, or 12 weight % or more, or 15 weight % or more, or 20 weight % or more, or 25 weight % or more, or 30 weight % or more, or 40 weight % or more, or 50 weight % or more, or 60 weight % or more, or 70 weight % or more, or 75 weight % or more.

In one embodiment the lignin or lignin derivatives are dearomatized. For example the lignin or lignin derivatives are dearomatized to at least 40%, or at least 50%, or at least 60%, or at least 70%, or at least 80%, or at least 90%, or at least 95% or at least 99%.

Solvents, Carrier Liquids and Additives

The composition according to the present invention comprises a solvent or a mixture of solvents. Preferred solvents are C1-C10 alcohols, C1-C10 ethers, C1-C10 ketones, C1-C10 aldehydes, C1-C10 sulfoxides and C1-C10 esters. Non-limiting examples are methanol, ethanol, propanol, isopropanol, 1,3-propanediol, glycerol, glycol, dipropylene glycol, and butyl ether such as tert-butyl methyl ether; diethyl ether, diglyme, diisopropyl ether, dimethyl sulfoxide (DMSO), tosylic acid, dimethoxyethane, diethylene glycol diethyl ether, petroleum ether, polyethylene glycol, 1,4-dioxane, furfural, acetone, 1,3-dioxolane, cyclopentylmethylether, 2-methyltetrahydrofuran, aromatic aldehydes (such as furfural) and tetrahydrofuran (THF). Preferred C1-C10 esters are organic esters, aromatic or non-aromatic esters, examples of esters are benzyl benzoate, various acetates such as methyl acetate, ethyl acetate and butyl acetate, various lactates such as ethyl lactates. Other suitable solvents are dimethyl formamide, pyridine and N-methyl pyrrolidone, or acids such as C1-C10 carboxylic acids such as formic acid, acetic acids, propanoic, butanoic acid, pentanoic acid, and hexanoic acid. In one embodiment the solvent comprises a combination of C1-C10 alcohols, C1-C10 ethers and C1-C10 esters. In one embodiment the solvent comprises two C1-C10 alcohols for example ethanol and glycerol, and in another embodiment the solvent comprises propanol and glycerol. In one embodiment the solvent comprises polyethylene glycol and a C1-C10 alcohol. In one embodiment the solvent comprises ethanol in combination with at least one of glycerol and polyethylene glycol. In another embodiment the solvent comprises glycerol in combination with polyethylene glycoL. In one embodiment at least one solvent is sulfoxide, an alcohol or an aldehyde. In one embodiment the solvent comprises a combination of a C1-C10 sulfoxide and a C1-C10 alcohol, or a C1-C10 sulfoxide and a C1-C10 aldehyde, or a C1-C10 alcohol and a C1-C10 aldehyde. In one embodiment the solvent comprises dimethyl sulfoxide, pyridine, THF, 1,4-dioxane, furfural, dipropylene glycol, polyethylene glycol or 1,3-propanediol, or a combination thereof. When the composition is to be used in a refinery the amount of solvent is preferably as low as possible, especially if the solvent contains heteroatoms such as oxygen. The amount of solvent is preferably 33 weight % or more, or 40 weight % or more, or 45 weight % or more, but not more than 66 weight %, or 60 weight % or less, or 55 weight % or less, or 50 weight % or less.

The purpose of the carrier liquid is to carry the wanted substrate or solution into the reactor without reacting or in any other way affecting the substrate or solution. Therefore, in the present application a carrier liquid is an inert hydrocarbon with a high boiling point, preferably at least 150° C. The composition may comprise a carrier liquid suitable for a hydro treater or a catalytic cracker, preferably a liquid suitable for both hydro treater and catalytic cracker. Such carrier liquids include various hydrocarbon oils. Hydro treater and catalytic cracker are steps in the refinery process where the sulfur content of the oil is reduced and where high-boiling, high molecular weight hydrocarbons are converted into gasoline, diesel and gases. The carrier liquid content may be at least 5 weight %, or at least 10 weight %, or at least 20 weight %, or at least 30 weight %, or at least 40 weight %, preferably at least 50 weight %, or preferably at least 60 weight %.

In one embodiment the composition comprises fatty acid. In another embodiment the composition comprises a mixture of esterified fatty acid and/or another fatty acid and/or rosin acid and/or resin acid. In one embodiment the fatty acid is a mixture derived from biomass comprising fatty acid. In one embodiment the mixture derived from biomass is tall oil. The composition according to the present invention may comprise a mixture of esterified fatty acid, another fatty acid and optionally rosin acid. The amount of fatty acid or any mixture comprising fatty acid in the composition may be 10 weight % or more, or 20 weight % or more, or 33 weight % or more, or 40 weight % or more, or 45 weight % or more but not more than 80 weight %, or 60 weight % or less, or 55 weight % or less, or 50 weight % or less. The mixture itself may comprise 10-50 weight % of esterified fatty acid, 10-50 weight % of other fatty acids, and 0-50 weight % of rosin acid, where the total amount of each component does not add up to more than 100 weight %. In one embodiment the amount of esterified fatty acid in the mixture is 15 weight % or more, or 25 weight/or more, or 45 weight % or less, or 35 weight % or less. In one embodiment the amount of another fatty acid in the mixture is 15 weight % or more, or 25 weight/or more, or 45 weight % or less, or 35 weight % or less. In one embodiment the amount of rosin acid in the mixture is 5 weight % or more, or 15 weight % or more, or 25 weight % or more, or 45 weight % or less, or 35 weight % or less. The fatty acid may be any saturated or unsaturated C6-C30 fatty acid, preferably C12-C20 such as C14, C16, C18, C19 or C20 fatty acid. When the composition comprises a fatty acid (or a mixture of fatty acids) and a hydrocarbon oil the weight ratio between the fatty acid and the hydrocarbon oil may be from 10:1 to 1:5, or 10:1 to 1:1, or 5:1 to 1:5, or 3:1 to 1:3, or 2:1 to 1:2, or 1:1.

The composition according to the present invention may be a one phase system. By keeping the composition in motion continuously or regularly the composition may stay in one phase for a prolonged time. Since the composition is meant to be used for example in a refinery the composition will be in motion and thereby it will be a one phase system. In one embodiment the composition is a one phase system at 70° C., preferably also at 25° C., when left for 10 minutes, preferably 30 minutes, preferably 1 hour, preferably when left for 24 hours.

When the carrier liquid is a hydrocarbon oil the oil needs to be in liquid phase below 80 OC and preferably have boiling points of 160-500° C., or 177-371° C. These hydrocarbon oils include different types of or gas oils and likewise e.g. Full Range Straight Run Middle Distillates, Hydrotreated, Middle Distillate, Light Catalytic Cracked Distillate, distillates Naphtha full-range straight-run, Distillates, hydrodesulfurized full-range, Distillates, solvent-dewaxed straight-range, Distillates, straight-run middle sulfenylated, Naphtha clay-treated full-range straight run, Distillates full-range atm, Distillates hydrotreated full-range, Distillates, straight-run light, Distillates heavy straight-run, Distillates (oil sand), straight-run middle-run, Naphtha (shale oil), hydrocracked, full-range straight run (example of but not restricted to CAS nr: 68476-30-2, 68814-87-9, 74742-46-7, 64741-59-9, 64741-44-2, 64741-42-0, 101316-57-8, 101316-58-9, 91722-55-3, 91995-58-3, 68527-21-9, 128683-26-1, 91995-46-9, 68410-05-9, 68915-96-8, 128683-27-2, 195459-19-9). Moreover substances can be solvated in lighter hydrocarbon fractions such as organic solvents e.g. mesitylene, toluene, benzene, petroleum ether, octanes, nonanes, decanes and also isomerized derivatives of these compounds or mixtures thereof (CAS nr: 108-88-3, 108-67-8, 71-43-2, 8032-32-4, 111-65-9, 111-84-2, 124-18-5).

The composition may further comprise at least one additive. The additive may be any additive suitable for the present composition known to a person skilled in the art. In one embodiment the additive may further enhance the dissolution of the lignin or lignin derivatives. The additive may have the function of dissolving or breaking up intermolecular bonds between the lignin chains or the lignin derivatives. In one embodiment the additive is a polar compound or a salt. An emulsifier may be added to the composition. The composition may further contain a base or a basic compound such as an amine, ammonia or ammonium hydroxide.

The additive may also affect the chemical structure of the lignin or lignin derivative and thereby making the lignin or lignin derivative more soluble. The additive may also be any viscosity reducer as described in U.S. Pat. No. 4,734,103 which is hereby incorporated by reference, or any viscosity reducer known to a person skilled in the art. The additive may be added in order to obtain a uniform dispersion of oil and water to improve the combustion efficiency and to stabilize the dispersion according to US2011/0203166 which is hereby incorporated by reference.

The additive may be added in catalytic or stoichiometric amount. The amount of the additive may be from 0 to 10 weight %, preferably between 0.25 to 5 weight %, or between 0.5 to 2 weight %. The additive may be added during any step of the method, for example the additive may be added to the black or red liquor or residual material from ethanol production, or prior to or after filtration or ultra-filtration, or prior or after acidification and separation.

Specific Compositions

The composition according to the present invention comprises at least 4 weight % of lignin and/or lignin derivatives, a solvent and carrier liquid wherein the lignin and/or lignin derivatives have a weight average molecular weight of not more than 5,000 g/mol, preferably 2,000 g/mol. The solvent comprises an alcohol, ester, sulfoxide, ketone, aldehyde or an ether. One composition according to the present invention comprises black liquor, ethanol, glycerol, and a fatty acid. Another composition comprises lignin or lignin derivatives, ethanol and glycerol, preferably also a fatty acid.

One composition comprises at least 20 weight % lignin or lignin derivatives having a weight average molecular weight of not more than 2,000 g/mol, wherein the solvent comprises an alcohol, DMSO or furfural; and a carrier liquid comprising a hydrocarbon oil. In one embodiment the lignin or lignin derivatives have a weight average molecular weight of not more than 1,000 g/mol.

In one embodiment the composition comprises 7 weight % or more of lignin or lignin derivatives and at least 30 weight/of carrier liquid.

In one embodiment the composition comprises at least 7 weight/lignin or lignin derivatives having a weight average molecular weight of not more than 2,000 g/mol, wherein the solvent comprises at least an alcohol, aldehyde or a sulfoxide; and a hydrocarbon oil and fatty acid in a 1:1 to 1:5 weight ratio.

In one embodiment of the present invention the composition comprises 1-50 weight % of lignin or lignin derivatives, 33-66 weight % of solvent, and 33-66 weight/of carrier liquid where the total amount of each component does not add up to more than 100 weight %. Another composition according to the present invention comprises at least 4 weight % lignin or lignin derivatives, a solvent comprising a C1-C10 alcohol or a C1-C10 sulfoxide or a C1-C10 aldehyde at a concentration of 5-30 weight %, and 10-50 weight % of a hydrocarbon oil. Another composition according to the present invention comprises at least 4 weight % lignin or lignin derivatives, a solvent comprising a C1-C10 alcohol or a C1-C10 sulfoxide or a C1-C10 aldehyde at a concentration of 5-30 weight %, and 10-50 weight % of a mixture of a fatty acid and a hydrocarbon oil.

Method of Preparing

The composition according to the present invention may be prepared by mixing a biomass material or the lignin or lignin derivatives in a solvent together with a carrier liquid, optionally also fatty acid. When the solvent is a mixture of more than one solvent the mixture may be prepared prior to the mixing with the biomass material/lignin, or all the solvents of the solvent mixture and the biomass material/lignin may be mixed at the same time. The carrier liquid may be added before, during or after the mixing step of solvent and biomass material/lignin. In one embodiment the oil is added after the mixing of biomass material and solvent. The mixing can be done by stirring or shaking or in any other suitable way.

The mixing may be performed at room temperature, but may be performed at a temperature between 50° C. and 350° C., such as 50° C. or more, or 100° C. or more, or 150° C. or more, but not more than 350° C., or 250° C. or less, or 200° C. or less. In one embodiment the carrier liquid is added after the mixing of solvent and biomass material/lignin and when the mixture of solvent and biomass material/lignin has cooled down, preferably below 100° C., or below 80° C. In another embodiment the lignin or lignin derivative is added to the carrier liquid, and optionally also fatty acid, prior to the addition of the solvent.

The black or red liquor may be used as it is but the liquor may be pre-treated by evaporation, separation or filtration or via chemical treatments such as the process described below and further defined in WO2012/121659.

The biomass material or the lignin in the composition may have been treated according to the process described in WO2012/121659 which is hereby incorporated by reference. The process relates to reduction or cleavage of a substrate, leading to depolymerization, wherein said substrate can be but is not limited to primary, secondary and tertiary benzylic or allylic alcohol, benzylic or allylic ether, benzylic or allylic carbonyl, and benzylic or allylic ester, or olefins to the corresponding hydrocarbon. The substrate may be lignin or any other compound or polymer comprising said functional group, or black or red liquor. A general method comprises adding a catalyst, a transition metal catalyst, to a reaction flask or container. Adding a solvent mixture of at least two solvents where one of the solvents is water and a base. The mixture is then heated followed by addition of a hydrogen donor and the substrate to be reduced. In order to inhibit disproportionation, a base or carbon dioxide should be added to the solvent mixture and catalyst prior to addition of a hydrogen donor and the substrate. The hydrogen donor may for example be formic acid or an alcohol, it may even be hydrogen gas. The reduction is performed at a temperature of 40-100° C. In one embodiment the amount of base is not stoichiometric to the amount of the substrate. The biomass or lignin may also be treated (depolymerized) according to the method disclosed in PCT/SE2013/051045 which is hereby incorporated by reference. A general method comprises mixing biomass or lignin, a hydrogen donor, a transition metal catalyst and at least one solvent. The hydrogen donor is preferably an alcohol and/or formic acid. The formed mixture is then heated to not more than 200° C. The biomass material or preferably the separated lignin and lignin derivatives obtained from the reduction or cleavage method may be dearomatized and may then be used as the lignin or lignin derivatives in the composition according to the present invention. In one embodiment the obtained biomass material from the chemical reduction is further treated with filtration, ultra-filtration or cross-flow ultra-filtration; or treated with acidification and separation such as the Lignoboost® technique.

In one embodiment the composition of the present invention may comprise a biomass material comprising lignin or lignin derivatives obtained through precipitation and separation of lignin and lignin derivatives for example by acidification and separation, such as filtration. Lignoboost® or any other similar separation technique are examples of such technique and may be used. The separated lignin and lignin derivatives may then be used as the biomass material in the composition according to the present invention. In another embodiment the separated lignin and lignin derivative may further be chemically reduced or cleaved or depolymerized using the method described above and in WO2012/121659.

Another method or a complimentary method for purifying or separating specific components in a biomass material is through filtration, ultra-filtration or cross-flow ultra-filtration. The lignin may be separated in respect to size through any of said filtration techniques. The lignin or lignin derivatives may also be separated in respect to size through a depolymerisation technique; this separation may be performed in combination with filtration, ultra-filtration or cross-flow ultra-filtration. By using filtration, ultra-filtration or cross-flow ultra-filtration on black or red liquor lignin or lignin derivatives with molecular weights of 10,000 g/mol or less may be separated, preferably the separated lignin or lignin derivatives have a molecular weight of 2,000 g/mol or less, such as 1,000 g/mol or less. The separated lignin and lignin derivatives may then be used in the composition according to the present invention. In one embodiment the lignin and lignin derivatives obtained from said filtration may further be chemically cleaved or reduced or depolymerized using the method described above and in WO2012/121659.

The biomass material/lignin may be filtered using any suitable filtering technique in order to obtain a molecular weight of the biomass material of 100 g/mol or more, for example 300 g/mol or more, or 500 g/mol or more than, but preferably 1200 g/mol or less, or 1000 g/mol or less, or 900 g/mol or less. To obtain the molecular weight the filtration may be performed in one or more steps using one or more filters having different cut offs. In one embodiment a chemical reduction using a transition metal catalyst as described above may be performed in between each filtering step. In one embodiment a chemical reduction or cleavage using a transition metal catalyst is performed after the final filtering step. In another embodiment a chemical reduction or cleavage using a transition metal catalyst is performed prior to the first filtering step. In yet another embodiment no catalytic reduction treatment is performed.

Another method of obtaining or separating lignin is to use a base as an additive. Some biorefineries that make ethanol from plants typically use a pretreatment process based on a base to separate the lignin from the cellulosic material that is converted to fuel.

For example the plant may be ground up, then mixed with a solution of ammonium hydroxide and heated to release the lignin.

In other words, the lignin or lignin derivative used in the composition according to the present invention may be obtained from biomass or biomass material that has been treated with one of the following steps:
a) chemical reduction or cleavage using a transition metal catalyst as described above;
b) acidification and separation, for example Lignoboost®;
c) filtration, ultra-filtration or cross-flow ultra-filtration; or
d) any combination thereof.

The biomass material is preferably black or red liquor or residual material from ethanol production. In one embodiment the lignin or lignin derivatives have been treated with at least one of the steps a)-c) above. In one embodiment the combination comprises step a) and c), in another embodiment the combination comprises step a) and b), and in yet another embodiment the combination comprises step b) and c). In an additional embodiment the biomass material/lignin may be obtained through a combination of a), b) and c) and wherein each step a), b) and c) may be performed more than one time. For example the combination may be in the order c), a), or c) b), a), or b), a), c); or b), c), a); or b), c) a), c); or b), a), c) a), c).

The composition according to the present invention may be used in a refinery process or as a pre-step to a refinery process for preparing fuel such as diesel and petrol, or diesel and petrol analogues; or biogasoline or biodiesel; or fuel additives.

The composition according to the present invention may also be used as or an additive or to be used to prepare an additive, for example as a concreted grinding aid, set retarder for cement, strengthener of cement, antioxidant, enhancer of thermal protection, stabilizer in asphalt, emulsifying agent, fiber strengthening additive, cross-linking agent, board binder, anti-corrosion additive, wear resistant additive, antifriction additive, binder, emulsifier or dispersing agent.

The composition may further be used to prepare foams, plastics, rubbers or paint. The esterified lignin may be used as a cross-linking or curing agent, or as a water absorption inhibitor or as a fluidization agent. Mechanical properties may also be enhanced by the use of the composition.

The composition may be added to surfaces to obtain dust control, or the composition may be used to prepare batteries.

The composition may be used to improve surface properties or to impregnate wood or as an anti-corrosion agent. The composition may be used to form an anti-bacterial or anti-fungal surface or to form a barrier. The composition may further be used to form carbon fiber.

EXAMPLES

In some of the examples below the following lignin types have been used.
Lignin type A1: acid precipitated lignin from black liquor
Lignin type A2: acid precipitated lignin from black liquor dried to 95% dry weight
Lignin type B: filtrated and acid precipitated black liquor
Lignin type C: depolymerized lignin, $M_w$ of around 1,500 g/mol
Lignin type F: depolymerized and dearomatized lignin In the examples below the symbol "<" means that not all of the substrate for example lignin was dissolved.

In the examples below the wording "mixture of fatty acids" or "liquid of fatty acids" are used interchangeably and denotes a mixture of fatty acids derived from biomass and wherein the mixture contains oleic acids.

Example 1

4-methylcatechol was stirred under heating (80° C.). A pourable liquid at 80° C. comprising 100 weight % of 4-methylcatechol was obtained.

Example 2

Syringol was stirred under heating (80° C.). A pourable liquid at 80° C. comprising 100 weight % of syringol was obtained.

Example 3

Coniferyl alcohol was stirred under heating (80° C.). A pourable liquid at 80° C. comprising 100 weight % of coniferyl alcohol was obtained.

Example 4

To a solution of ethyl acetate (0.0298 g) 4-methylcatechol (0.1355 g) was added in one portion or stepwise. The suspension was stirred under heating (80° C.). A pourable solution at 80° C. comprising 82 weight % of 4-methylcatechol was obtained.

To a solution of acetone (0.0225 g) 4-methylcatechol (0.0993 g) was added in one portion or stepwise. The suspension was stirred under heating (80° C.). A pourable solution at 80° C. comprising 82 weight % of 4-methylcatechol was obtained.

Example 6

To a solution of ethyl acetate (0.0173 g) syringol (0.1143 g) was added in one portion or stepwise. The suspension was stirred under heating (80° C.). A pourable solution at 80° C. comprising 87 weight % of syringol was obtained.

Example 7

To a solution of acetone (0.0197 g) syringol (0.1215 g) was added in one portion or stepwise. The suspension was stirred under heating (80° C.). A pourable solution at 80° C. comprising 86 weight % of syringol was obtained.

Example 8

To a solution of ethyl acetate (0.0274 g) coniferyl alcohol (0.1107 g) was added in one portion or stepwise. The suspension was stirred under heating (80° C.). A pourable solution at 80° C. comprising 80 weight % of coniferyl alcohol was obtained.

Example 9

To a solution of acetone (0.0350 g) coniferyl alcohol (0.1043 g) was added in one portion or stepwise. The suspension was stirred under heating (80° C.). A pourable solution at 80° C. comprising 75 weight % of coniferyl alcohol was obtained.

Example 10

To a solution of ethyl acetate (200 g) 4-hydroxybenzoic acid (100 g) was added in one portion or stepwise. The suspension was stirred under heating. Upon cooling a solution comprising 10 weight % of 4-hydroxybenzoic acid was obtained.

Example 11

To a solution of ethyl acetate (200 g) 4-hydroxybenzaldehyde (100 g) was added in one portion or stepwise. The suspension was stirred under heating. Upon cooling a solution comprising 18 weight % of 4-hydroxybenzaldehyde was obtained.

Example 12

To a solution of ethyl acetate (200 g) vanillic acid (100 g) was added in one portion or stepwise. The suspension was stirred under heating. Upon cooling a solution comprising 2 weight % of vanillic acid was obtained.

Example 13

To a solution of ethyl acetate (200 g) syringic acid (100 g) was added in one portion or stepwise. The suspension was stirred under heating. Upon cooling a solution comprising 1 weight/of syringic acid was obtained.

Example 14

To a solution of ethyl acetate (200 g) 4-hydroxyacetophenone (100 g) was added in one portion or stepwise. The suspension was stirred under heating. Upon cooling a solution comprising 26 weight/of 4-hydroxyacetophenone was obtained.

Example 15

To a solution of ethyl acetate (200 g) vanillin (100 g) was added in one portion or stepwise. The suspension was stirred under heating. Upon cooling a solution comprising 27 weight % of vanillin was obtained.

Example 16

To a solution of ethyl acetate (200 g) syringaldehyde (100 g) was added in one portion or stepwise. The suspension was stirred under heating. Upon cooling a solution comprising 6 weight/of syringaldehyde was obtained.

Example 17

To a solution of ethyl acetate (200 g) acetovanillone (100 g) was added in one portion or stepwise. The suspension was stirred under heating. Upon cooling a solution comprising 8 weight/of acetovanillone was obtained.

Example 18

To a solution of ethyl acetate (200 g) ferulic acid (100 g) was added in one portion or stepwise. The suspension was stirred under heating. Upon cooling a solution comprising 3 weight % of ferulic acid was obtained.

Example 19

To a solution of ethyl acetate (200 g) acetosyringone (100 g) was added in one portion or stepwise. The suspension was stirred under heating. Upon cooling a solution comprising 5 weigh % of acetosyringone was obtained.

Example 20

To a solution of ethyl acetate (200 g) catechol (100 g) was added in one portion or stepwise. The suspension was stirred under heating. Upon cooling a solution comprising 49 weight/of catechol was obtained.

Example 21

To a solution of ethyl acetate (200 g) p-coumaric acid (100 g) was added in one portion or stepwise. The suspension was stirred under heating. Upon cooling a solution comprising 3 weight % of p-coumaric acid was obtained.

Example 22

To a solution of ethanol (200 g) 4-hydroxybenzoic acid (100 g) was added in one portion or stepwise. The suspension was stirred under heating. Upon cooling a solution comprising 31 weight/of 4-hydroxybenzoic acid was obtained.

Example 23

To a solution of ethanol (200 g) 4-hydroxybenzaldehyde (100 g) was added in one portion or stepwise. The suspension was stirred under heating. Upon cooling a solution comprising 44 weight/of 4-hydroxybenzaldehyde was obtained.

Example 24

To a solution of ethanol (200 g) vanillic acid (100 g) was added in one portion or stepwise. The suspension was stirred under heating. Upon cooling a solution comprising 10 weight % of vanillic acid was obtained.

Example 25

To a solution of ethanol (200 g) syringic acid (100 g) was added in one portion or stepwise. The suspension was stirred under heating. Upon cooling a solution comprising 4 weight % of syringic acid was obtained.

Example 26

To a solution of ethanol (200 g) 4-hydroxyacetophenone (100 g) was added in one portion or stepwise. The suspension was stirred under heating. Upon cooling a solution comprising 50 weight/of 4-hydroxyacetophenone was obtained.

Example 27

To a solution of ethanol (200 g) vanillin (100 g) was added in one portion or stepwise. The suspension was stirred under heating. Upon cooling a solution comprising 43 weight/of vanillin was obtained.

Example 28

To a solution of ethanol (200 g) syringaldehyde (100 g) was added in one portion or stepwise. The suspension was stirred under heating. Upon cooling a solution comprising 7 weight/of syringaldehyde was obtained.

Example 29

To a solution of ethanol (200 g) acetovanillone (100 g) was added in one portion or stepwise. The suspension was stirred under heating. Upon cooling a solution comprising 10 weight/of acetovanillone was obtained.

Example 30

To a solution of ethanol (200 g) ferulic acid (100 g) was added in one portion or stepwise. The suspension was stirred under heating. Upon cooling a solution comprising 10 weight/of ferulic acid was obtained.

Example 31

To a solution of ethanol (200 g) acetosyringone (100 g) was added in one portion or stepwise. The suspension was stirred under heating. Upon cooling a solution comprising 5 weight % of acetosyringone was obtained.

Example 32

To a solution of ethanol (200 g) p-coumaric acid (100 g) was added in one portion or stepwise. The suspension was stirred under heating. Upon cooling a solution comprising 14 weight % of p-coumaric acid was obtained.

Example 33

To a solution of petroleum ether (200 g) 4-hydroxybenzoic acid (100 g) was added in one portion or stepwise. The suspension was stirred under heating. Upon cooling a solution comprising 0.3 weight % of 4-hydroxybenzoic acid was obtained.

Example 34

To a solution of petroleum ether (200 g) 4-hydroxybenzaldehyde (100 g) was added in one portion or stepwise. The suspension was stirred under heating. Upon cooling a solution comprising 0.3 weight % of 4-hydroxybenzaldehyde was obtained.

Example 35

To a solution of petroleum ether (200 g) vanillic acid (100 g) was added in one portion or stepwise. The suspension was stirred under heating. Upon cooling a solution comprising 0.1 weight % of vanillic acid was obtained.

Example 36

To a solution of petroleum ether (200 g) syringic acid (100 g) was added in one portion or stepwise. The suspension was stirred under heating. Upon cooling a solution comprising 0.04 weight % of syringic acid was obtained.

Example 37

To a solution of petroleum ether (200 g) 4-hydroxyacetophenone (100 g) was added in one portion or stepwise. The suspension was stirred under heating. Upon cooling a solution comprising 0.1 weight % of 4-hydroxyacetophenone was obtained.

Example 38

To a solution of petroleum ether (200 g) vanillin (100 g) was added in one portion or stepwise. The suspension was stirred under heating. Upon cooling a solution comprising 0.4 weight % of vanillin was obtained.

Example 39

To a solution of petroleum ether (200 g) syringaldehyde (100 g) was added in one portion or stepwise. The suspension was stirred under heating. Upon cooling a solution comprising 0.2 weight % of syringaldehyde was obtained.

Example 40

To a solution of petroleum ether (200 g) acetovanillone (100 g) was added in one portion or stepwise. The suspension was stirred under heating. Upon cooling a solution comprising 0.4 weight % of acetovanillone was obtained.

Example 41

To a solution of petroleum ether (200 g) ferulic acid (100 g) was added in one portion or stepwise. The suspension was stirred under heating. Upon cooling a solution comprising 0.1 weight % of ferulic acid was obtained.

Example 42

To a solution of petroleum ether (200 g) acetosyringone (100 g) was added in one portion or stepwise. The suspension was stirred under heating. Upon cooling a solution comprising 0.2 weight % of acetosyringone was obtained.

Example 43

To a solution of petroleum ether (200 g) catechol (100 g) was added in one portion or stepwise. The suspension was stirred under heating. Upon cooling a solution comprising 0.1 weight % of catechol was obtained.

Example 44

To a solution of petroleum ether (200 g) p-coumaric acid (100 g) was added in one portion or stepwise. The suspension was stirred under heating. Upon cooling a solution comprising 0.2 weight % of p-coumaric acid was obtained.

Example 45

To a solution of acetone (200 g) 4-hydroxybenzoic acid (100 g) was added in one portion or stepwise. The suspension was stirred under heating. Upon cooling a solution comprising 23 weight/of 4-hydroxybenzoic acid was obtained.

Example 46

To a solution of acetone (200 g) 4-hydroxybenzaldehyde (100 g) was added in one portion or stepwise. The suspension was stirred under heating. Upon cooling a solution comprising 40 weight/of 4-hydroxybenzaldehyde was obtained.

Example 47

To a solution of acetone (200 g) vanillic acid (100 g) was added in one portion or stepwise. The suspension was stirred under heating. Upon cooling a solution comprising 10 weight % of vanillic acid was obtained.

Example 48

To a solution of acetone (200 g) syringic acid (100 g) was added in one portion or stepwise. The suspension was stirred under heating. Upon cooling a solution comprising 5 weight/ of syringic acid was obtained.

Example 49

To a solution of acetone (200 g) 4-hydroxyacetophenone (100 g) was added in one portion or stepwise. The suspension was stirred under heating. Upon cooling a solution comprising 48 weight/of 4-hydroxyacetophenone was obtained.

Example 50

To a solution of acetone (200 g) vanillin (100 g) was added in one portion or stepwise. The suspension was stirred under heating. Upon cooling a solution comprising 50 weight % of vanillin was obtained.

Example 51

To a solution of acetone (200 g) syringaldehyde (100 g) was added in one portion or stepwise. The suspension was stirred under heating. Upon cooling a solution comprising 20 weight/of syringaldehyde was obtained.

Example 52

To a solution of acetone (200 g) acetovanillone (100 g) was added in one portion or stepwise. The suspension was stirred under heating. Upon cooling a solution comprising 22 weight/of acetovanillone was obtained.

Example 53

To a solution of acetone (200 g) ferulic acid (100 g) was added in one portion or stepwise. The suspension was stirred under heating. Upon cooling a solution comprising 14 weight/of ferulic acid was obtained.

Example 54

To a solution of acetone (200 g) acetosyringone (100 g) was added in one portion or stepwise. The suspension was stirred under heating. Upon cooling a solution comprising 16 weight/of acetosyringone was obtained.

Example 55

To a solution of acetone (200 g) catechol (200 g) was added in one portion or stepwise. The suspension was stirred under heating. Upon cooling a solution comprising 66 weight/of catechol was obtained.

Example 56

To a solution of acetone (200 g) p-coumaric acid (100 g) was added in one portion or stepwise. The suspension was stirred under heating. Upon cooling a solution comprising 12 weight/of p-coumaric acid was obtained.

Example 57

To a solution of polyethylene glycol (200 g) 4-hydroxybenzoic acid (100 g) was added in one portion or stepwise. The suspension was stirred under heating. Upon cooling a solution comprising 33 weight/of 4-hydroxybenzoic acid was obtained.

Example 58

To a solution of polyethylene glycol (200 g) 4-hydroxybenzaldehyde (100 g) was added in one portion or stepwise. The suspension was stirred under heating. Upon cooling a solution comprising 31 weight/of 4-hydroxybenzaldehyde was obtained.

Example 59

To a solution of polyethylene glycol (200 g) vanillic acid (100 g) was added in one portion or stepwise. The suspension was stirred under heating. Upon cooling a solution comprising 17 weight/of vanillic acid was obtained.

Example 60

To a solution of polyethylene glycol (200 g) syringic acid (100 g) was added in one portion or stepwise. The suspension was stirred under heating. Upon cooling a solution comprising 14 weight/of syringic acid was obtained.

Example 61

To a solution of polyethylene glycol (200 g) 4-hydroxy-acetophenone (100 g) was added in one portion or stepwise. The suspension was stirred under heating. Upon cooling a solution comprising 29 weight/of 4-hydroxyacetophenone was obtained.

Example 62

To a solution of polyethylene glycol (200 g) vanillin (100 g) was added in one portion or stepwise. The suspension was stirred under heating. Upon cooling a solution comprising <48 weight % of vanillin was obtained.

Example 63

To a solution of polyethylene glycol (200 g) syringaldehyde (100 g) was added in one portion or stepwise. The suspension was stirred under heating. Upon cooling a solution comprising 11 weigh % of syringaldehyde was obtained.

Example 64

To a solution of polyethylene glycol (200 g) acetovanillone (100 g) was added in one portion or stepwise. The suspension was stirred under heating. Upon cooling a solution comprising 13 weight/of acetovanillone was obtained.

Example 65

To a solution of polyethylene glycol (200 g) ferulic acid (100 g) was added in one portion or stepwise. The suspension was stirred under heating. Upon cooling a solution comprising 26 weight/of ferulic acid was obtained.

Example 66

To a solution of polyethylene glycol (200 g) p-coumaric acid (100 g) was added in one portion or stepwise. The suspension was stirred under heating. Upon cooling a solution comprising 11 weigh % of p-coumaric acid was obtained.

Example 67

To a solution of glycerol (200 g) 4-hydroxybenzoic acid (100 g) was added in one portion or stepwise. The suspension was stirred under heating. Upon cooling a solution comprising 14 weight/of 4-hydroxybenzoic acid was obtained.

Example 68

To a solution of glycerol (200 g) 4-hydroxybenzaldehyde (100 g) was added in one portion or stepwise. The suspension was stirred under heating. Upon cooling a solution comprising <20 weight % of 4-hydroxybenzaldehyde was obtained.

Example 69

To a solution of glycerol (200 g) vanillic acid (100 g) was added in one portion or stepwise. The suspension was stirred under heating. Upon cooling a solution comprising <8 weight % of vanillic acid was obtained.

Example 70

To a solution of glycerol (200 g) syringic acid (100 g) was added in one portion or stepwise. The suspension was stirred under heating. Upon cooling a solution comprising <8 weight % of syringic acid was obtained.

Example 71

To a solution of glycerol (200 g) 4-hydroxyacetophenone (100 g) was added in one portion or stepwise. The suspension was stirred under heating. Upon cooling a solution comprising 10 weight/of 4-hydroxyacetophenone was obtained.

Example 72

To a solution of glycerol (200 g) vanillin (100 g) was added in one portion or stepwise. The suspension was stirred under heating. Upon cooling a solution comprising <28 weight % of vanillin was obtained.

Example 73

To a solution of glycerol (200 g) syringaldehyde (100 g) was added in one portion or stepwise. The suspension was stirred under heating. Upon cooling a solution comprising 25 weight/of syringaldehyde was obtained.

Example 74

To a solution of glycerol (200 g) acetovanillone (100 g) was added in one portion or stepwise. The suspension was stirred under heating. Upon cooling a solution comprising <20 weight/of acetovanillone was obtained.

Example 75

To a solution of glycerol (200 g) ferulic acid (100 g) was added in one portion or stepwise. The suspension was stirred under heating. Upon cooling a solution comprising <3 weight % of ferulic acid was obtained.

Example 76

To a solution of glycerol (200 g) p-coumaric acid (100 g) was added in one portion or stepwise. The suspension was stirred under heating. Upon cooling a solution comprising 17 weight % of p-coumaric acid was obtained.

Example 77

To a solution of ethyl acetate (1.3543 g) Lignin type A1 (0.0196 g) was added in one portion or stepwise. The suspension was stirred under heating. Upon cooling a solution comprising <1 weight % of Lignin type A1 was obtained.

Example 78

To a solution of ethanol (1.1185 g) Lignin type A1 (0.0203 g) was added in one portion or stepwise. The suspension was stirred under heating. Upon cooling a solution comprising <2 weight % of Lignin type A1 was obtained.

Example 79

To a solution of acetone (1.0509 g) Lignin type A1 (0.0202 g) was added in one portion or stepwise. The suspension was stirred under heating. Upon cooling a solution comprising <2 weight % of Lignin type A1 was obtained.

Example 80

To a solution of polyethylene glycol (1.3389 g) Lignin type A1 (0.1967 g) was added in one portion or stepwise. The suspension was stirred under heating. Upon cooling a solution comprising 13 weight % of Lignin type A1 was obtained.

Example 81

To a solution of glycerol (1.6616 g) Lignin type A1 (0.0198 g) was added in one portion or stepwise. The suspension was stirred under heating. Upon cooling a solution comprising <1 weight % of Lignin type A1 was obtained.

Example 82

To a solution of 2-methyltetrahydrofuran (1.202 g) Lignin type A1 (0.0204 g) was added in one portion or stepwise. The suspension was stirred under heating. Upon cooling a solution comprising <2 weight % of Lignin type A1 was obtained.

Example 83

To a solution of cyclopentylmethylether (1.2125 g) Lignin type A1 (0.0198 g) was added in one portion or stepwise. The suspension was stirred under heating. Upon cooling a solution comprising <2 weight % of Lignin type A1 was obtained.

Example 84

To a solution of 1,3-propanediol (0.7703 g) Lignin type A1 (0.1982 g) was added in one portion or stepwise. The suspension was stirred under heating. Upon cooling a solution comprising 20 weight % of Lignin type A1 was obtained.

Example 85

To a solution of 1,3-dioxolane (0.1451 g) Lignin type A1 (0.2045 g) was added in one portion or stepwise. The suspension was stirred under heating. Upon cooling a solution comprising 58 weight % of Lignin type A1 was obtained.

Example 86

To a solution of furfural (0.2804 g) Lignin type A1 (0.2046 g) was added in one portion or stepwise. The suspension was stirred under heating. Upon cooling a solution comprising 42 weight % of Lignin type A1 was obtained.

Example 87

To a solution of dipropylene glycol (0.4636 g) Lignin type A1 (0.2009 g) was added in one portion or stepwise. The suspension was stirred under heating. Upon cooling a solution comprising 30 weight % of Lignin type A1 was obtained.

Example 88

To a solution of 1,4-dioxane (0.2094 g) Lignin type A1 (0.1993 g) was added in one portion or stepwise. The suspension was stirred under heating. Upon cooling a solution comprising 49 weight % of Lignin type A1 was obtained.

Example 89

To a solution of methanol (1.1244 g) Lignin type A1 (0.0208 g) was added in one portion or stepwise. The suspension was stirred under heating. Upon cooling a solution comprising <2 weight % of Lignin type A1 was obtained.

Example 90

To a solution of isopropanol (0.979 g) Lignin type A1 (0.0207 g) was added in one portion or stepwise. The suspension was stirred under heating. Upon cooling a solution comprising <2 weight % of Lignin type A1 was obtained.

Example 91

To a solution of dimethyl sulfoxide (0.2904 g) Lignin type A1 (0.2075 g) was added in one portion or stepwise. The suspension was stirred under heating. Upon cooling a solution comprising 42 weight/of Lignin type A1 was obtained.

Example 92

To a solution of tetrahydrofuran (0.1482 g) Lignin type A1 (0.1976 g) was added in one portion or stepwise. The suspension was stirred under heating. Upon cooling a solution comprising 57 weight/of Lignin type A1 was obtained.

Example 93

To a solution of pyridine (0.1604 g) Lignin type A1 (0.2083 g) was added in one portion or stepwise. The suspension was stirred under heating. Upon cooling a solution comprising 56 weight % of Lignin type A1 was obtained.

Example 94

To a solution of acetic acid (1.4342 g) Lignin type A1 (0.0209 g) was added in one portion or stepwise. The suspension was stirred under heating. Upon cooling a solution comprising <1 weight % of Lignin type A1 was obtained.

Example 95

To a solution of hexanoic acid (1.3893 g) Lignin type A1 (0.0206 g) was added in one portion or stepwise. The suspension was stirred under heating. Upon cooling a solution comprising <1 weight % of Lignin type A1 was obtained.

Example 97

To a solution of ethyl acetate (1.3474 g) Lignin type A2 (0.0240 g) was added in one portion or stepwise. The suspension was stirred under heating. Upon cooling a solution comprising <2 weight % of Lignin type A2 was obtained.

Example 98

To a solution of acetone (1.0364 g) Lignin type A2 (0.0267 g) was added in one portion or stepwise. The suspension was stirred under heating. Upon cooling a solution comprising <3 weight % of Lignin type A2 was obtained.

Example 99

To a solution of polyethylene glycol (0.7623 g) Lignin type A2 (0.1162 g) was added in one portion or stepwise. The suspension was stirred under heating. Upon cooling a solution comprising 13 weight % of Lignin type A2 was obtained.

Example 100

To a solution of glycerol (1.5214 g) Lignin type A2 (0.0303 g) was added in one portion or stepwise. The suspension was stirred under heating. Upon cooling a solution comprising <2 weight % of Lignin type A2 was obtained.

Example 101

To a solution of 2-methyltetrahydrofuran (1.1851 g) Lignin type A2 (0.0224 g) was added in one portion or stepwise. The suspension was stirred under heating. Upon cooling a solution comprising <2 weight % of Lignin type A2 was obtained.

Example 102

To a solution of cyclopentylmethylether (1.2764 g) Lignin type A2 (0.0259 g) was added in one portion or stepwise. The suspension was stirred under heating. Upon cooling a solution comprising <2 weight % of Lignin type A2 was obtained.

Example 103

To a solution of 1,3-propanediol (0.4012 g) Lignin type A2 (0.1014 g) was added in one portion or stepwise. The suspension was stirred under heating. Upon cooling a solution comprising 20 weight % of Lignin type A2 was obtained.

Example 104

To a solution of 1,3-dioxolane (0.1334 g) Lignin type A2 (0.1161 g) was added in one portion or stepwise. The suspension was stirred under heating. Upon cooling a solution comprising 47 weight/of Lignin type A2 was obtained.

Example 105

To a solution of furfural (0.1389 g) Lignin type A2 (0.1021 g) was added in one portion or stepwise. The suspension was stirred under heating. Upon cooling a solution comprising 42 weight % of Lignin type A2 was obtained.

Example 106

To a solution of dipropylene glycol (0.3033 g) Lignin type A2 (0.1081 g) was added in one portion or stepwise. The suspension was stirred under heating. Upon cooling a solution comprising 26 weight % of Lignin type A2 was obtained.

Example 107

To a solution of 1,4-dioxane (0.2017 g) Lignin type A2 (0.1052 g) was added in one portion or stepwise. The suspension was stirred under heating. Upon cooling a solution comprising 34 weight/of Lignin type A2 was obtained.

Example 108

To a solution of methanol (1.0575 g) Lignin type A2 (0.0239 g) was added in one portion or stepwise. The suspension was stirred under heating. Upon cooling a solution comprising <2 weight % of Lignin type A2 was obtained.

Example 109

To a solution of isopropanol (0.9578 g) Lignin type A2 (0.0316 g) was added in one portion or stepwise. The suspension was stirred under heating. Upon cooling a solution comprising <3 weight % of Lignin type A2 was obtained.

Example 110

To a solution of dimethyl sulfoxide (0.2170 g) Lignin type A2 (0.1110 g) was added in one portion or stepwise. The suspension was stirred under heating. Upon cooling a solution comprising 34 weight % of Lignin type A2 was obtained.

Example 111

To a solution of tetrahydrofuran (0.0968 g) Lignin type A2 (0.1005 g) was added in one portion or stepwise. The suspension was stirred under heating. Upon cooling a solution comprising 51 weight/of Lignin type A2 was obtained.

Example 112

To a solution of pyridine (0.1723 g) Lignin type A2 (0.1062 g) was added in one portion or stepwise. The suspension was stirred under heating. Upon cooling a solution comprising 38 weight % of Lignin type A2 was obtained.

Example 113

To a solution of acetic acid (1.4939 g) Lignin type A2 (0.0268 g) was added in one portion or stepwise. The suspension was stirred under heating. Upon cooling a solution comprising <2 weight % of Lignin type A2 was obtained.

Example 114

To a solution of benzonitrile (1.3149 g) Lignin type A2 (0.0272 g) was added in one portion or stepwise. The suspension was stirred under heating. Upon cooling a solution comprising <2 weight % of Lignin type A2 was obtained.

Example 132

To a mixture comprising 1,3-propanediol (0.4058 g) and citric acid (0.1330 g), Lignin type A2 (0.2036 g) was added in one portion or stepwise. The suspension was stirred under heating. A pourable solution at 70° C. comprising 27 weight % of Lignin type A2 was obtained.

Example 133

To a mixture comprising 1,3-propanediol (0.4211 g) and TWEEN-20 (0.2933 g) (a polysorbate surfactant), Lignin type A2 (0.2101 g) was added in one portion or stepwise. The suspension was stirred under heating. A pourable solution at 70° C. comprising 23 weight % of Lignin type A2 was obtained.

Example 134

To a mixture comprising 1,3-propanediol (0.4045 g) and 3-(N,N-dimethyl octadecylammonio)propanesulfone) (0.0660 g), Lignin type A2 (0.2018 g) was added in one portion or stepwise. The suspension was stirred under heating. A pourable solution at 70° C. comprising 30 weight % of Lignin type A2 was obtained.

Example 135

To a mixture comprising 1,3-propanediol (0.4130 g) and pyridine (0.0643 g), Lignin type A2 (0.2013 g) was added in one portion or stepwise. The suspension was stirred under heating. A pourable solution at 70° C. comprising 30 weight % of Lignin type A2 was obtained.

Example 136

To a mixture comprising 1,3-propanediol (0.4130 g) and triethylamine (0.1266 g), Lignin type A2 (0.2010 g) was added in one portion or stepwise. The suspension was stirred under heating. A pourable solution at 70° C. comprising 27 weight % of Lignin type A2 was obtained.

Example 137

To a mixture comprising 1,3-propanediol (0.4510 g) and Nonidet P (0.3111 g), Lignin type A2 (0.2084 g) was added in one portion or stepwise. The suspension was stirred under heating. A pourable solution at 70° C. comprising 21 weight % of Lignin type A2 was obtained.

Example 141

To a solution of a mixture comprising fatty acid (0.1074) derived from biomass and the Lignin type A1 (0.1003 g) was polyethylene glycol (1.5078 g) added in one portion or stepwise until the lignin was dissolved. The suspension was stirred under heating.
Upon cooling a solution comprising 6 weight % of Lignin type A1 was obtained.

Example 142

To a solution of a mixture comprising fatty acid (0.0994) derived from biomass and Lignin type A1 (0.1043 g) was 1,3-propanediol (0.4308 g) added in one portion or stepwise until the lignin was dissolved. The suspension was stirred under heating. Upon cooling a solution comprising 16 weight % of Lignin type A1 was obtained.

Example 143

To a solution of a mixture comprising fatty acid (0.1045 g) derived from biomass and Lignin type A1 (0.1025 g) was 1,3-dioxolane (0.7963 g) added in one portion or stepwise until the lignin was dissolved. The suspension was stirred under heating. Upon cooling a solution comprising 10 weight % of Lignin type A1 was obtained.

All the following examples were performed in the same manner unless otherwise stated, i.e. the solvent or solvents were added until the lignin was dissolved.

Example 144

To a solution of furfural (0.3969 g) and a mixture comprising fatty acid (0.1076 g) derived from biomass, the Lignin type A1 (0.1040 g) was added in one portion or stepwise. The solvent was added until the lignin was dissolved. The suspension was stirred under heating. Upon cooling a solution comprising 17 weight % of Lignin type A1 was obtained.

Example 145

To a solution of 1,4-dioxane (0.9763 g) and a mixture comprising fatty acid (0.0963 g) derived from biomass, the Lignin type A1 (0.1047 g) was added in one portion or stepwise. The solvent was added until the lignin was dissolved. The suspension was stirred under heating. Upon cooling a solution comprising 9 weight % of Lignin type A1 was obtained.

Example 146

To a solution of dimethyl sulfoxide (0.2718 g) and a mixture comprising fatty acid (0.1164 g) derived from biomass, the Lignin type A1 (0.1001 g) was added in one portion or stepwise. The solvent was added until the lignin was dissolved. The suspension was stirred under heating. Upon cooling a biphasic solution comprising 21 weight % of Lignin type A1 was obtained.

Example 147

To a solution of pyridine (0.3529 g) and a mixture comprising fatty acid (0.1074 g) derived from biomass, the Lignin type A1 (0.0953 g) was added in one portion or stepwise. The solvent was added until the lignin was dissolved. The suspension was stirred under heating. Upon cooling a solution comprising 17 weight % of Lignin type A1 was obtained.

Example 148

To a solution of polyethylene glycol (0.5676 g) Lignin type A1 (0.1023 g) was added in one portion or stepwise. The solvent was added until the lignin was dissolved. The suspension was stirred under heating. Upon cooling a solution comprising 15 weight % or Lignin type A1 was obtained.

Example 149

To a solution of 1,3-propanediol (0.6385 g) Lignin type A1 (0.1021 g) was added in one portion or stepwise. The solvent was added until the lignin was dissolved. The suspension was stirred under heating. Upon cooling a solution comprising 14 weight % or Lignin type A1 was obtained.

Example 150

To a solution of 1,3-dioxolane (0.2125 g) Lignin type A1 (0.1031 g) was added in one portion or stepwise. The solvent was added until the lignin was dissolved. The suspension was stirred under heating. Upon cooling a solution comprising 33 weight % or Lignin type A1 was obtained.

Example 151

To a solution of furfural (0.3224 g) Lignin type A1 (0.1000 g) was added in one portion or stepwise. The solvent was added until the lignin was dissolved. The suspension was stirred under heating. Upon cooling a solution comprising 24 weight % or Lignin type A1 was obtained.

Example 152

To a solution of dipropylene glycol (0.3551 g) Lignin type A1 (0.0989) was added in one portion or stepwise. The solvent was added until the lignin was dissolved. The suspension was stirred under heating. Upon cooling a solution comprising 22 weight % or Lignin type A1 was obtained.

Example 153

To a solution of 1,4-dioxane (0.1558 g) Lignin type A1 (0.1014 g) was added in one portion or stepwise. The solvent was added until the lignin was dissolved. The suspension was stirred under heating. Upon cooling a solution comprising 39 weight % or Lignin type A1 was obtained.

Example 154

To a solution of dimethyl sulfoxide (0.3627 g) Lignin type A1 (0.0983 g) was added in one portion or stepwise. The solvent was added until the lignin was dissolved. The suspension was stirred under heating. Upon cooling a solution comprising 21 weight % or Lignin type A1 was obtained.

Example 155

To a solution of tetrahydrofuran (0.1417 g) Lignin type A1 (0.0978 g) was added in one portion or stepwise. The solvent was added until the lignin was dissolved. The suspension was stirred under heating. Upon cooling a solution comprising 41 weight % or Lignin type A1 was obtained.

Example 156

To a solution of pyridine (0.1364 g) Lignin type A1 (0.1005 g) was added in one portion or stepwise. The solvent was added until the lignin was dissolved. The suspension was stirred under heating. Upon cooling a solution comprising 42 weight % or Lignin type A1 was obtained.

Example 157

To a solution of polyethylene glycol (0.2891 g) Lignin type A1 (0.0205 g) was added in one portion or stepwise. The solvent was added until the lignin was dissolved. The suspension was stirred under heating. Upon cooling a solution comprising 7 weight % or Lignin type A1 was obtained.

Example 158

To a solution of 1,3-propanediol (0.2026 g) Lignin type A1 (0.0207 g) was added in one portion or stepwise. The solvent was added until the lignin was dissolved. The suspension was stirred under heating. Upon cooling a solution comprising 9 weight % or Lignin type A1 was obtained.

Example 159

To a solution of 1,3-dioxolane (0.0876 g) Lignin type A1 (0.0203 g) was added in one portion or stepwise. The solvent was added until the lignin was dissolved. The suspension was stirred under heating. Upon cooling a solution comprising 19 weight % or Lignin type A1 was obtained.

Example 160

To a solution of furfural (0.1255 g) Lignin type A1 (0.0208 g) was added in one portion or stepwise. The solvent was added until the lignin was dissolved. The suspension was stirred under heating. Upon cooling a solution comprising 14 weight % or Lignin type A1 was obtained.

Example 161

To a solution of dipropylene glycol (0.3157 g) Lignin type A1 (0.0195 g) was added in one portion or stepwise. The solvent was added until the lignin was dissolved. The suspension was stirred under heating. Upon cooling a solution comprising 6 weight % or Lignin type A1 was obtained.

Example 162

To a solution of 1,4-dioxane (0.1712 g) Lignin type A1 (0.0207 g) was added in one portion or stepwise. The solvent was added until the lignin was dissolved. The suspension was stirred under heating. Upon cooling a solution comprising 11 weight % or Lignin type A1 was obtained.

Example 163

To a solution of dimethyl sulfoxide (0.2532 g) Lignin type A1 (0.0204 g) was added in one portion or stepwise. The solvent was added until the lignin was dissolved. The suspension was stirred under heating. Upon cooling a solution comprising 7 weight % or Lignin type A1 was obtained.

Example 164

To a solution of tetrahydrofuran (0.0739 g) Lignin type A1 (0.0201 g) was added in one portion or stepwise. The solvent was added until the lignin was dissolved. The suspension was stirred under heating. Upon cooling a solution comprising 21 weight % or Lignin type A1 was obtained.

Example 165

To a solution of pyridine (0.1179 g) Lignin type A1 (0.0201 g) was added in one portion or stepwise. The solvent was added until the lignin was dissolved. The suspension was stirred under heating. Upon cooling a solution comprising 15 weight % or Lignin type A1 was obtained.

Example 166

To a solution of a mixture comprising fatty acids (0.1946 g) derived from biomass and Lignin type A2 (0.2098 g) was furfural (0.4078 g) added in one portion or stepwise until the lignin was dissolved. The suspension was stirred under heating (80° C.). Upon cooling a solution comprising 26 weight % of Lignin type A2 was obtained.

Example 167

To a solution of a mixture comprising fatty acids (0.2105 g) derived from biomass and Lignin type B (0.2100 g) was furfural (0.2918 g) added in one portion or stepwise until the lignin was dissolved. The suspension was stirred under heating (80° C.). Upon cooling a solution comprising 29 weight % of Lignin type B was obtained.

Example 168

To a solution of a mixture comprising fatty acids (0.2089 g) derived from biomass and Lignin type B (0.2196 g) was furfural (0.4016 g) added in one portion or stepwise until the lignin was dissolved. The suspension was stirred under heating (80° C.). Upon cooling a solution comprising 26 weight % of Lignin type B was obtained.

Example 169

To Lignin type A2 (0.0101 g) oleic acid (1.3499 g) was added in one portion. The mixture was stirred under heating (70 degrees). A solution at 70 degrees comprising <0.7 weight % Lignin type A2 was obtained.

Example 170

To a solution of isophorone (0.1660 g) Lignin type A2 (0.1341 g) was added in one portion or stepwise. The suspension was stirred under heating (70° C.). A pourable solution at 70° C. comprising 45 weight % of Lignin type A2 was obtained.

Example 171

To a solution of mesityl oxide (0.1119 g) Lignin type A2 (0.1087 g) was added in one portion or stepwise. The suspension was stirred under heating (70° C.). A pourable solution at 70° C. comprising 49 weight % of Lignin type A2 was obtained.

Example 172

To a solution of ethyl acetate (0.0366 g) Lignin type C (0.0992 g) was added in one portion or stepwise. The suspension was stirred under heating (70° C.). A pourable solution at 70° C. comprising 73 weight % of Lignin type C was obtained.

Example 173

To a solution of ethanol (0.0289 g) Lignin type C (0.1004 g) was added in one portion or stepwise. The suspension was stirred under heating (70° C.). A pourable solution at 70° C. comprising 78 weight % of Lignin type C was obtained.

Example 174

To a solution of petroleum ether (0.9516 g) Lignin type C (0.0985 g) was added in one portion or stepwise. The suspension was stirred under heating (70° C.). A solution comprising <9 weight % of Lignin type C was obtained.

Example 175

To a solution of acetone (0.0396 g) Lignin type C (0.1086 g) was added in one portion or stepwise. The suspension was stirred under heating (70° C.). A pourable solution at 70° C. comprising 73 weight % of Lignin type C was obtained.

Example 176

To a solution of polyethylene glycol (0.1142 g) Lignin type C (0.0985 g) was added in one portion or stepwise. The suspension was stirred under heating (70° C.). A pourable solution at 70° C. comprising 46 weight % of Lignin type C was obtained.

Example 177

To a solution of glycerol (1.1062 g) Lignin type C (0.1008 g) was added in one portion or stepwise. The suspension was stirred under heating (70° C.). A solution comprising <8 weight % of Lignin type C was obtained.

Example 178

To a solution of 2-methyltetrahydrofuran (0.0554 g) Lignin type C (0.1003 g) was added in one portion or stepwise. The suspension was stirred under heating (70° C.). A pourable solution at 70° C. comprising 64 weight % of Lignin type C was obtained.

Example 179

To a solution of cyclopentyl methyl ether (0.0329 g) Lignin type C (0.0988 g) was added in one portion or stepwise. The suspension was stirred under heating (70° C.). A pourable solution at 70° C. comprising 75 weight % of Lignin type C was obtained.

Example 180

To a solution of 1,3-propanediol (0.0799 g) Lignin type C (0.0895 g) was added in one portion or stepwise. The suspension was stirred under heating (70° C.). A pourable solution at 70° C. comprising 53 weight % of Lignin type C was obtained.

Example 181

To a solution of 1,3-dioxolane (0.0527 g) Lignin type C (0.0912 g) was added in one portion or stepwise. The suspension was stirred under heating (70° C.). A pourable solution at 70° C. comprising 63 weight % of Lignin type C was obtained.

Example 182

To a solution of furfural (0.0601 g) Lignin type C (0.1010 g) was added in one portion or stepwise. The suspension was stirred under heating (70° C.). A pourable solution at 70° C. comprising 63 weight % of Lignin type C was obtained.

Example 183

To a solution of dipropylene glycol (0.0497 g) Lignin type C (0.0919 g) was added in one portion or stepwise. The suspension was stirred under heating (70° C.). A pourable solution at 70° C. comprising 65 weight % of Lignin type C was obtained.

Example 184

To a solution of 1,4-dioxane (0.0378 g) Lignin type C (0.0977 g) was added in one portion or stepwise. The suspension was stirred under heating (70° C.). A pourable solution at 70° C. comprising 72 weight % of Lignin type C was obtained.

Example 185

To a solution of methanol (0.0286 g) Lignin type C (0.0951 g) was added in one portion or stepwise. The suspension was stirred under heating (70° C.). A pourable solution at 70° C. comprising 77 weight % of Lignin type C was obtained.

Example 186

To a solution of isopropanol (0.0484 g) Lignin type C (0.0903 g) was added in one portion or stepwise. The suspension was stirred under heating (70° C.). A pourable solution at 70° C. comprising 65 weight % of Lignin type C was obtained.

Example 187

To a solution of dimethyl sulfoxide (0.0645 g) Lignin type C (0.0921 g) was added in one portion or stepwise. The suspension was stirred under heating (70° C.). A pourable solution at 70° C. comprising 59 weight % of Lignin type C was obtained.

Example 188

To a solution of tetrahydrofuran (0.0556 g) Lignin type C (0.0980 g) was added in one portion or stepwise. The suspension was stirred under heating (70° C.). A pourable solution at 70° C. comprising 64 weight % of Lignin type C was obtained.

Example 189

To a solution of pyridine (0.0562 g) Lignin type C (0.1011 g) was added in one portion or stepwise. The suspension was stirred under heating (70° C.). A pourable solution at 70° C. comprising 64 weight % of Lignin type C was obtained.

Example 190

To a solution of acetic acid (0.0322 g) Lignin type C (0.1006 g) was added in one portion or stepwise. The suspension was stirred under heating (70° C.). A pourable solution at 70° C. comprising 75 weight % of Lignin type C was obtained.

Example 191

To a solution of hexanoic acid (1.0702 g) Lignin type C (0.0915 g) was added in one portion or stepwise. The suspension was stirred under heating (70° C.). A solution comprising <8 weight % of Lignin type C was obtained.

Example 192

To a solution of isophorone (0.0565 g) Lignin type C (0.0951 g) was added in one portion or stepwise. The suspension was stirred under heating (70° C.). A pourable solution at 70° C. comprising 63 weight % of Lignin type C was obtained.

Example 193

To a solution of mesityl oxide (0.0405 g) Lignin type C (0.1002 g) was added in one portion or stepwise. The suspension was stirred under heating (70° C.). A pourable solution at 70° C. comprising 71 weight % of Lignin type C was obtained.

Example 194

To a solution of a 1:1 weight ratio mixture of gas oil and a liquid comprising fatty acid (0.1214 g, total weight of gas oil and fatty acid) and Lignin type A2 (0.0242 g) was polyethylene glycol (0.2348 g) added in one portion or stepwise until the lignin was dissolved. The suspension was stirred under heating (70° C.). Upon cooling a solution comprising 6 weight % of Lignin type A2 was obtained.

Example 195

To a solution of a 1:1 weight ratio mixture of gas oil and a liquid comprising fatty acid (0.1300 g, total weight of gas oil and fatty acid) and Lignin type A2 (0.0255 g) was 1,3-propanediol (0.1411 g) added in one portion or stepwise until the lignin was dissolved. The suspension was stirred under heating (70° C.). Upon cooling a solution comprising 9 weight/of Lignin type A2 was obtained.

Example 196

To a solution of a 1:1 weight ratio mixture of gas oil and a liquid comprising fatty acid (0.1241 g, total weight of gas oil and fatty acid) and Lignin type A2 (0.0249 g) was furfural (0.1384 g) added in one portion or stepwise until the lignin was dissolved. The suspension was stirred under heating (70° C.). Upon cooling a solution comprising 9 weight % of Lignin type A2 was obtained.

Example 197

To a solution of a 1:1 weight ratio mixture of gas oil and a liquid comprising fatty acid (0.1314 g, total weight of gas oil and fatty acid) and Lignin type A2 (0.0201 g) was dipropylene glycol (0.4044 g) added in one portion or stepwise until the lignin was dissolved. The suspension was stirred under heating (70° C.). Upon cooling a solution comprising 4 weight % of Lignin type A2 was obtained.

Example 198

To a solution of a 1:1 weight ratio mixture of gas oil and a liquid comprising fatty acid (0.1270 g, total weight of gas oil and fatty acid) and Lignin type A2 (0.0217 g) was dimethyl sulfoxide (0.0722 g) added in one portion or stepwise until the lignin was dissolved. The suspension was stirred under heating (70° C.). Upon cooling a solution comprising 10 weight % of Lignin type A2 was obtained.

Example 199

To Lignin type A2 (0.1197 g) a solution of furfural and 1,3-propanediol in a 1:1 weight ratio mixture (0.2795 g) was added until a pourable solution was obtained at 70° C. A pourable solution at 70° C. comprising 30 weight % Lignin type A2 was obtained.

Example 200

To Lignin type A2 (0.1190 g) a solution of dimethyl sulfoxide and 1,4-dioxane in a 1:1 weight ratio mixture (0.1345 g) was added until a pourable solution was obtained at 70° C. A pourable solution at 70° C. comprising 47 weight % Lignin type A2 was obtained.

Example 201

To Lignin type A2 (0.1263 g) a solution of dimethyl sulfoxide and 1,3-propanediol in a 1:1 weight ratio mixture (0.2437 g) was added until a pourable solution was obtained at 70° C. A pourable solution at 70° C. comprising 34 weight % Lignin type A2 was obtained.

Example 202

To Lignin type A2 (0.1124 g) a solution of dimethyl sulfoxide and pyridine in a 1:1 weight ratio mixture (0.1783 g total weight of DMSO and pyridine) was added until a pourable solution was obtained at 70° C. A pourable solution at 70° C. comprising 39 weight % Lignin type A2 was obtained.

Example 203

To Lignin type A2 (0.1046 g) a solution of methanol (1.0686 g) was added and stirred at 70° C. A solution comprising <9 weight % Lignin type A2 was obtained.

Example 204

To Lignin type A2 (0.1275 g) a solution of 7N ammonia in methanol (0.2669 g) was added and stirred at 70° C. A solution comprising <32 weight % Lignin type A2 was obtained.

Example 205

Preparation of Lignin type C using two different nickel catalysts 5.0 g of Lignin type A2 was dissolved in 70 mL isopropanol, 5.3 g of wet Raneynickel 4200 was added and the reaction was heated at 160° C. for 18 hours in a 100 mL closed steal autoclave. After cooling, the dissolved lignin was transferred to a round bottom flask and the isopropanol was evaporated. 2.61 g of product was collected, 52% yield.

5.0 g of Lignin type A2 was dissolved in 70 mL isopropanol, 5.3 g of wet Raneynickel 2800 was added and the reaction was heated at 160° C. for 18 hours in a 100 mL closed steal autoclave. After cooling, the dissolved lignin was transferred to a round bottom flask and the isopropanol was evaporated. 3.00 g of product was collected, 60% yield.

Example 206

To a suspension of Lignin type C (0.0240 g) in a 1:1 weight ratio mixture of light gas oil and a liquid comprising fatty acid (0.1309 g), ethyl acetate (1.1303 g) was added and stirred at 70° C. A solution at 70° C. comprising <2 weight % Lignin type C was obtained.

Example 207

To a suspension of Lignin type C (0.0268 g) in a 1:1 weight ratio mixture of light gas oil and a liquid comprising fatty acid (0.1223 g), ethanol (0.9791 g) was added and stirred at 70° C. A solution at 70° C. comprising <2 weight % Lignin type C was obtained.

Example 208

To a suspension of Lignin type C (0.0284 g) in a 1:1 weight ratio mixture of light gas oil and a liquid comprising fatty acid (0.1176 g), acetone (0.6696 g) was added and stirred at 70° C. A solution at 70° C. comprising <3 weight % Lignin type C was obtained.

Example 209

To a suspension of Lignin type C (0.0248 g) in a 1:1 weight ratio mixture of light gas oil and a liquid comprising fatty acid (0.1298 g), polyethylene glycol (0.0901 g) was added and stirred at 70° C. A biphasic solution at 70° C. comprising 10 weight % Lignin type C was obtained.

Example 210

To a suspension of Lignin type C (0.0220 g) in a 1:1 weight ratio mixture of light gas oil and a liquid comprising fatty acid (0.1214 g), glycerol (0.6450 g) was added and stirred at 70° C. A solution at 70° C. comprising <3 weight % Lignin type C was obtained.

Example 211

To a suspension of Lignin type C (0.0293 g) in a 1:1 weight ratio mixture of light gas oil and a liquid comprising fatty acid (0.1334 g), 2-methyltetrahydrofuran (0.9027 g) was added and stirred at 70° C. A solution at 70° C. comprising <3 weight % Lignin type C was obtained.

Example 212

To a suspension of Lignin type C (0.0232 g) in a 1:1 weight ratio mixture of light gas oil and a liquid comprising fatty acid (0.1340 g), cyclopentylmethylether (0.8313 g) was added and stirred at 70° C. A solution at 70° C. comprising <2 weight % Lignin type C was obtained.

Example 213

To a suspension of Lignin type C (0.0224 g) in a 1:1 weight ratio mixture of light gas oil and a liquid comprising fatty acid (0.1291 g), 1,3-propanediol (0.0286 g) was added and stirred at 70° C. A biphasic solution at 70° C. comprising 12 weight % Lignin type C was obtained.

Example 214

To a suspension of Lignin type C (0.0211 g) in a 1:1 weight ratio mixture of light gas oil and a liquid comprising fatty acid (0.1386 g), 1,3-dioxolane (0.3543 g) was added and stirred at 70° C. A solution at 25° C. comprising 4 weight % Lignin type C was obtained.

Example 215

To a suspension of Lignin type C (0.0254 g) in a 1:1 weight ratio mixture of light gas oil and a liquid comprising fatty acid (0.1376 g), furfural (0.0676 g) was added and stirred at 70° C. A biphasic solution at 70° C. comprising 11 weight % Lignin type C was obtained.

Example 216

To a suspension of Lignin type C (0.0227 g) in a 1:1 weight ratio mixture of light gas oil and a liquid comprising fatty acid (0.1399 g), dipropylene glycol (0.2048 g) was added and stirred at 70° C. A solution at 25° C. comprising 6 weight % Lignin type C was obtained.

Example 217

To a suspension of Lignin type C (0.0272 g) in a 1:1 weight ratio mixture of light gas oil and a liquid comprising fatty acid (0.1413 g), 1,4-dioxane (0.3958 g) was added and stirred at 70° C. A solution at 25° C. comprising 5 weight % Lignin type C was obtained.

Example 218

To a suspension of Lignin type C (0.0243 g) in a 1:1 weight ratio mixture of light gas oil and a liquid comprising fatty acid (0.1408 g), methanol (0.8046 g) was added and stirred at 70° C. A solution at 25° C. comprising 3 weight % Lignin type C was obtained.

Example 219

To a suspension of Lignin type C (0.0239 g) in a 1:1 weight ratio mixture of light gas oil and a liquid comprising fatty acid (0.1208 g), isopropanol (0.6760 g) was added and stirred at 70° C. A solution at 70° C. comprising <3 weight % Lignin type C was obtained.

Example 220

To a suspension of Lignin type C (0.0244 g) in a 1:1 weight ratio mixture of light gas oil and a liquid comprising fatty acid (0.1289 g), dimethyl sulfoxide (0.0682 g) was added and stirred at 70° C. A biphasic solution at 70° C. comprising 11 weight % Lignin type C was obtained.

Example 221

To a suspension of Lignin type C (0.0203 g) in a 1:1 weight ratio mixture of light gas oil and a liquid comprising fatty acid (0.1300 g), tetrahydrofuran (0.4983 g) was added and stirred at 70° C. A solution at 25° C. comprising 3 weight % Lignin type C was obtained.

Example 222

To a suspension of Lignin type C (0.0246 g) in a 1:1 weight ratio mixture of light gas oil and a liquid comprising fatty acid (0.1233 g), pyridine (0.1727 g) was added and stirred at 70° C. A biphasic solution at 70° C. comprising 8 weight % Lignin type C was obtained.

Example 223

To a suspension of Lignin type C (0.0270 g) in a 1:1 weight ratio mixture of light gas oil and a liquid comprising fatty acid (0.1213 g), acetic acid (1.4428 g) was added and stirred at 70° C. A solution at 70° C. comprising <2 weight % Lignin type C was obtained.

Example 224

To a suspension of Lignin type C (0.0213 g) in a 1:1 weight ratio mixture of light gas oil and a liquid comprising fatty acid (0.1185 g), hexanoic acid (1.0270 g) was added and stirred at 70° C. A solution at 70° C. comprising <2 weight % Lignin type C was obtained.

Example 225

To a suspension of Lignin type C (0.0223 g) in a 1:1 weight ratio mixture of light gas oil and a liquid comprising fatty acid (0.1186 g), isophorone (0.4511 g) was added and stirred at 70° C. A solution at 25° C. comprising 4 weight % Lignin type C was obtained.

Example 226

To a suspension of Lignin type C (0.0273 g) in a 1:1 weight ratio mixture of light gas oil and a liquid comprising fatty acid (0.1267 g), mesityl oxide (0.4408 g) was added and stirred at 70° C. A solution at 70° C. comprising <2 weight % Lignin type C was obtained.

Example 227

To a suspension of Lignin type C (0.0215 g) in light gas oil (0.1248 g), ethyl acetate (1.3574 g) was added and stirred at 70° C. A solution at 70° C. comprising <1 weight % Lignin type C was obtained.

Example 228

To a suspension of Lignin type C (0.0259 g) in light gas oil (0.1241 g), ethanol (1.0178 g) was added and stirred at 70° C. A solution at 70° C. comprising <2 weight % Lignin type C was obtained.

Example 229

To a suspension of Lignin type C (0.0259 g) in light gas oil (0.1256 g), acetone (0.7940 g) was added and stirred at 70° C. A solution at 70° C. comprising <3 weight % Lignin type C was obtained.

Example 230

To a suspension of Lignin type C (0.0224 g) in light gas oil (0.1220 g), polyethylene glycol (0.0384 g) was added and stirred at 70° C. A biphasic solution at 70° C. comprising 12 weight % Lignin type C was obtained.

Example 231

To a suspension of Lignin type C (0.0240 g) in light gas oil (0.1240 g), glycerol (0.6579 g) was added and stirred at 70° C. A solution at 70° C. comprising <3 weight % Lignin type C was obtained.

Example 232

To a suspension of Lignin type C (0.0249 g) in light gas oil (0.1350 g), 2-methyltetrahydrofuran (0.9880 g) was added and stirred at 70° C. A solution at 70° C. comprising <2 weight % Lignin type C was obtained.

Example 233

To a suspension of Lignin type C (0.0250 g) in light gas oil (0.1305 g), cyclopentylmethylether (0.9308 g) was added and stirred at 70° C. A solution at 70° C. comprising <2 weight % Lignin type C was obtained.

Example 234

To a suspension of Lignin type C (0.0243 g) in light gas oil (0.1273 g), 1,3-propanediol (0.0274 g) was added and stirred at 70° C. A biphasic solution at 70° C. comprising 14 weight % Lignin type C was obtained.

Example 235

To a suspension of Lignin type C (0.0218 g) in light gas oil (0.1316 g), 1,3-dioxolane (0.4085 g) was added and stirred at 70° C. A solution at 25° C. comprising 4 weight % Lignin type C was obtained.

Example 236

To a suspension of Lignin type C (0.0236 g) in light gas oil (0.1262 g), furfural (0.0408 g) was added and stirred at 70° C. A biphasic solution at 70° C. comprising 12 weight % Lignin type C was obtained.

Example 237

To a suspension of Lignin type C (0.0268 g) in light gas oil (0.1241 g), dipropylene glycol (0.0564 g) was added and stirred at 25° C. A solution at 25° C. comprising 13 weight % Lignin type C was obtained.

Example 238

To a suspension of Lignin type C (0.0236 g) in light gas oil (0.1262 g), 1,4-dioxane (0.4513 g) was added and stirred at 70° C. A solution at 25° C. comprising 4 weight % Lignin type C was obtained.

Example 239

To a suspension of Lignin type C (0.0216 g) in light gas oil (0.1198 g), methanol (0.0235 g) was added and stirred at 70° C. A biphasic solution at 70° C. comprising 13 weight % Lignin type C was obtained.

Example 240

To a suspension of Lignin type C (0.0203 g) in light gas oil (0.1340 g), isopropanol (0.7374 g) was added and stirred at 70° C. A solution at 70° C. comprising <2 weight % Lignin type C was obtained.

Example 241

To a suspension of Lignin type C (0.0283 g) in light gas oil (0.1269 g), dimethyl sulfoxide (0.0481 g) was added and stirred at 70° C. A biphasic solution at 70° C. comprising 14 weight % Lignin type C was obtained.

Example 242

To a suspension of Lignin type C (0.0258 g) in light gas oil (0.1256 g), tetrahydrofuran (0.9601 g) was added and stirred at 70° C. A solution at 25° C. comprising 2 weight % Lignin type C was obtained.

Example 243

To a suspension of Lignin type C (0.0259 g) in light gas oil (0.1250 g), pyridine (0.0775 g) was added and stirred at 70° C. A biphasic solution at 70° C. comprising 11 weight % Lignin type C was obtained.

Example 244

To a suspension of Lignin type C (0.0261 g) in light gas oil (0.1271 g), acetic acid (0.0784 g) was added and stirred at 70° C. A biphasic solution at 70° C. comprising 11 weight % Lignin type C was obtained.

Example 245

To a suspension of Lignin type C (0.0260 g) in light gas oil (0.1197 g), hexanoic acid (1.0185 g) was added and stirred at 70° C. A solution at 70° C. comprising <2 weight % Lignin type C was obtained.

Example 246

To a suspension of Lignin type C (0.0242 g) in light gas oil (0.1307 g), isophorone (0.4408 g) was added and stirred at 70° C. A solution at 25° C. comprising 4 weight % Lignin type C was obtained.

Example 247

To a suspension of Lignin type C (0.0236 g) in light gas oil (0.1207 g), mesityl oxide (0.9485 g) was added and stirred at 70° C. A solution at 70° C. comprising <2 weight % Lignin type C was obtained.

Example 248

To a suspension of Lignin type A2 (0.0258 g) in a 1:1 weight ratio mixture of light gas oil and a liquid comprising fatty acid (0.1182 g), a 1:1 weight ratio mixture of furfural and 1,3-propanediol (0.1316 g) was added and stirred at 70° C. A biphasic solution at 70° C. comprising 9 weight % Lignin type A2 was obtained.

Example 249

To a suspension of Lignin type A2 (0.0306 g) in a 1:1 weight ratio mixture of light gas oil and a liquid comprising fatty acid (0.1172 g), a 1:1 weight ratio mixture of dimethyl sulfoxide and 1,4-dioxane (0.1272 g) was added and stirred at 70° C. A solution at 70° C. comprising 11 weight % Lignin type A2 was obtained. When additional 1:1 weight ratio mixture of dimethyl sulfoxide and 1,4-dioxane (0.4052 g) was added a solution at 25° C. comprising 4 weight % was obtained.

Example 250

To a suspension of Lignin type A2 (0.0326 g) in a 1:1 weight ratio mixture of light gas oil and a liquid comprising fatty acid (0.1216 g), a 1:1 weight ratio mixture of dimethyl sulfoxide and 1,3-propanediol (0.1068 g) was added and stirred at 70° C. A biphasic solution at 70° C. comprising 12 weight % Lignin type A2 was obtained. When additional 1:1 weight ratio mixture of dimethyl sulfoxide and 1,3-propanediol (0.1929 g) was added a solution at 25° C. comprising 7 weight % was obtained.

Example 251

To a suspension of Lignin type A2 (0.0403 g) in a 1:1 weight ratio mixture of light gas oil and a liquid comprising fatty acid (0.1168 g), a 1:1 weight ratio mixture of dimethyl sulfoxide and pyridine (0.1192 g) was added and stirred at 70° C. A biphasic solution at 70° C. comprising 15 weight % Lignin type A2 was obtained. When additional 1:1 weight ratio mixture of dimethyl sulfoxide and pyridine (0.1553 g) was added a solution at 25° C. comprising 10 weight % was obtained Example 252

To a suspension of Lignin type A2 (0.0219 g) in a 1:1 weight ratio mixture of light gas oil and a liquid comprising fatty acid (0.1101 g), a 1:1 weight ratio mixture of furfural and 1,3-dioxolane (0.3912 g) was added and stirred at 70° C. A solution at 70° C. comprising <4 weight % Lignin type A2 was obtained.

Example 253

To a suspension of Lignin type A2 (0.0228 g) in a 1:1 weight ratio mixture of light gas oil and a liquid comprising fatty acid (0.1380 g), a 1:1 weight ratio mixture of polyethylene glycol and tetrahydrofuran (0.1188 g) was added and stirred at 70° C. A solution at 70° C. comprising 8 weight % Lignin type A2 was obtained.

Example 254

To a suspension of Lignin type A2 (0.0229 g) in a 1:1 weight ratio mixture of light gas oil and a liquid comprising fatty acid (0.1214 g), a 1:1 weight ratio mixture of pyridine and isophorone (0.4489 g) was added and stirred at 70° C. A solution at 70° C. comprising <4 weight % Lignin type A2 was obtained.

Example 255

To a suspension of Lignin type F (0.100 g) in light gas oil (0.1943 g), 1,3-dioxolane (0.1350 g) was added and stirred at 70° C. A biphasic solution at 70° C. comprising 23 weight % Lignin type F was obtained. When additional 1,3-dioxolane (0.1206 g) was added a more homogeneous solution at 70° C. comprising 18 weight % was obtained.

Example 256

To a suspension of Lignin type F (0.100 g) in light gas oil (0.1919 g), dipropylene glycol (0.0804 g) was added and stirred at 70° C. A biphasic solution at 70° C. comprising 27 weight/Lignin type F was obtained. When additional dipropylene glycol (0.2702 g) was added a more homogeneous solution at 70° C. comprising 16 weight % was obtained.

Example 257

To a suspension of Lignin type F (0.100 g) in light gas oil (0.1462 g), 1,4-dioxane (0.0704 g) was added and stirred at 70° C. A biphasic solution at 70° C. comprising 32 weight % Lignin type F was obtained.

Example 258

To a suspension of Lignin type F (0.100 g) in light gas oil (0.1553 g), methanol (0.0237 g) was added and stirred at 70° C. A biphasic solution at 70° C. comprising 36 weight % Lignin type F was obtained.

Example 259

To a suspension of Lignin type F (0.100 g) in light gas oil (0.1531 g), tetrahydrofuran (0.0425 g) was added and stirred at 70° C. A biphasic solution at 70° C. comprising 34 weight/Lignin type F was obtained.

Example 260

To a suspension of Lignin type F (0.100 g) in light gas oil (0.1561 g), isophorone (0.0791 g) was added and stirred at 70° C. A biphasic solution at 70° C. comprising 30 weight/ Lignin type F was obtained.

Example 261

To a suspension of Lignin type A2 (0.0998 g) in a 3:7 mixture of light gas oil and a liquid comprising fatty acid (0.1123 g), a 1:1 weight ratio mixture of furfural and 1,3-propanediol (0.2197 g) was added and stirred at 70° C. A solution at 70° C. comprising 23 weight/Lignin type A2 was obtained.

Example 262

To a suspension of Lignin type A2 (0.0986 g) in a 3:7 mixture of light gas oil and a liquid comprising fatty acid (0.1188 g), a 1:1 weight ratio mixture of dimethyl sulfoxide and 1,4-dioxane (0.2199 g) was added and stirred at 70° C. A solution at 70° C. comprising 23 weight % Lignin type A2 was obtained.

Example 263

To a suspension of Lignin type A2 (0.1014 g) in a 3:7 mixture of light gas oil and a liquid comprising fatty acid (0.1224 g), a 1:1 weight ratio mixture of dimethyl sulfoxide and 1,3-propanediol (0.1404 g) was added and stirred at 70° C. A biphasic solution at 70° C. comprising 28 weight % Lignin type A2 was obtained. When additional 1:1 weight ratio mixture of dimethyl sulfoxide and 1,3-propanediol (0.1241 g) was added a solution at 70° C. comprising 21 weight % was obtained.

Example 264

To a suspension of Lignin type A2 (0.1020 g) in a 3:7 mixture of light gas oil and a liquid comprising fatty acid (0.1227 g), a 1:1 weight ratio mixture of dimethyl sulfoxide and pyridine (0.2128 g) was added and stirred at 70° C. A solution at 70° C. comprising 23 weight % Lignin type A2 was obtained.

Example 265

To a suspension of Lignin type A2 (0.1023 g) in a 3:7 mixture of light gas oil and a liquid comprising fatty acid (0.1135 g), a 1:1 weight ratio mixture of polyethylene glycol and tetrahydrofuran (0.3085 g) was added and stirred at 70° C. A solution at 70° C. comprising 20 weight % Lignin type A2 was obtained.

Example 266

To a suspension of Lignin type A2 (0.0961 g) in a 3:7 mixture of light gas oil and a liquid comprising fatty acid (0.1288 g), polyethylene glycol (0.3054 g) was added and stirred at 70° C. A solution at 70° C. comprising 18 weight % Lignin type A2 was obtained.

Example 267

To a suspension of Lignin type A2 (0.0981 g) in a 3:7 mixture of light gas oil and a liquid comprising fatty acid (0.1257 g), 1,3-propanediol (0.1608 g) was added and stirred at 70° C. A solution at 70° C. comprising 26 weight % Lignin type A2 was obtained.

Example 268

To a suspension of Lignin type A2 (0.1035 g) in a 3:7 mixture of light gas oil and a liquid comprising fatty acid (0.1263 g), furfural (0.1921 g) was added and stirred at 70° C. A solution at 70° C. comprising 25 weight % Lignin type A2 was obtained.

Example 269

To a suspension of Lignin type A2 (0.1047 g) in a 3:7 mixture of light gas oil and a liquid comprising fatty acid (0.1292 g), dipropylene glycol (0.5455 g) was added and stirred at 70° C. A solution at 70° C. comprising 13 weight % Lignin type A2 was obtained.

Example 270

To a suspension of Lignin type A2 (0.1022 g) in a 3:7 mixture of light gas oil and a liquid comprising fatty acid (0.1182 g), dimethyl sulfoxide (0.1992 g) was added and stirred at 70° C. A solution at 70° C. comprising 24 weight % Lignin type A2 was obtained.

Example 271

Preparation of Lignin Type F Using Nickel Catalysts 1.0 g of Lignin type B was dissolved in 70 mL isopropanol, 3.3 g of wet Raneynickel 2800 was added and the reaction was heated at 160° C. for 18 hours in a 100 mL closed steal autoclave. After cooling, the dissolved lignin was transferred to a round bottom flask and the isopropanol was evaporated. 0.64 g of product was collected, 64% yield.

The invention claimed is:

1. A composition comprising:
    a lignin;
    a solvent;
    a carrier liquid; and
    a fatty acid,
    wherein the lignin constitutes at least 4 weight % of the composition,
    wherein the lignin has a weight average molecular weight of not more than 5,000 g/mol,
    wherein the solvent is an alcohol, ether, organic ester, sulfoxide, ketone, aldehyde or a combination thereof, and
    wherein the carrier liquid is a hydrocarbon oil.

2. The composition according to claim 1, wherein the composition comprises 7 weight % of lignin or more.

3. The composition according to claim 1, wherein the carrier liquid content is at least 20 weight %.

4. The composition according to claim 1, wherein the weight average molecular weight of the lignin is not more than 2000 g/mol.

5. The composition according to claim 1, wherein the composition comprises 7 weight % or more of lignin and at least 30 weight % of carrier liquid.

6. The composition according to claim 1, wherein the solvent is a sulfoxide, an alcohol or an aldehyde.

7. The composition according to claim 1, wherein
    the composition comprises at least 7 weight % lignin having a weight average molecular weight of not more than 2,000 g/mol;
    wherein the solvent is an alcohol, aldehyde or a sulfoxide; and
    the carrier liquid and the fatty acid are in a 1:1 to 1:5 weight ratio.

8. The composition according to claim 1, wherein the solvent comprises dimethyl sulfoxide, tetrahydrofuran (THF), 1,4-dioxane, furfural, dipropylene glycol, polyethylene glycol, 1,3-propanediol, or a combination thereof.

9. A method of producing the composition according to claim 1, the method comprising:
    providing lignin having a weight average molecular weight of not more than 5,000 g/mol;
    providing a solvent including an alcohol, ether, sulfoxide, ketone, aldehyde, ester or a combination thereof, a carrier liquid including a hydrocarbon oil, and a fatty acid; and
    adding the lignin to the solvent and the carrier liquid to obtain a concentration of lignin of at least 4 weight % and mixing the resultant.

10. The method of claim 9, wherein the composition is heated during mixing to a temperature between 50 and 350° C.

11. The method according to claim 9, wherein the lignin is derived from black or red liquor, or lignin from ethanol production.

12. The method according to claim 9 wherein the lignin is obtained from:
chemical reduction using a transition metal catalyst;
acidification and separation;
filtration, ultra-filtration or cross-flow ultra-filtration; or
any combination thereof,
of black or red liquor or residual material from ethanol production.

13. A method of using the composition according to claim 1 for preparing fuel.

14. A fuel obtained from the composition according to claim 1.

15. A method of using the composition according to claim 1 for producing chemicals or paint.

16. A method of using the composition according to claim 1 as one of concreted grinding aid, set retarder for cement, strengthener of cement, antioxidant, enhancer of thermal protection, stabilizer in asphalt, emulsifying agent, fiber strengthening additive, cross-linking agent, board binder, anti-corrosion additive, wear resistant additive, antifriction additive, binder, emulsifier, dispersing agent, cross-linking or curing agent, a water absorption inhibitor, a fluidization agent, an anti-bacterial or anti-fungal surface, a barrier to impregnate wood, or an anti-corrosion agent.

17. The composition according to claim 1, wherein the composition is a one phase system.

* * * * *